(12) United States Patent
Kalamkar et al.

(10) Patent No.: US 12,483,922 B2
(45) Date of Patent: Nov. 25, 2025

(54) DYNAMIC DISTRIBUTED EXTENDED REALITY COMPUTE

(71) Applicant: QUALCOMM Incorporated, San Diego, CA (US)

(72) Inventors: Sanket Sanjay Kalamkar, San Diego, CA (US); Ravi Agarwal, San Diego, CA (US); Saadallah Kassir, San Diego, CA (US); Peerapol Tinnakornsrisuphap, San Diego, CA (US); Prashanth Haridas Hande, San Diego, CA (US); Jeya Pradha Jeyaraj, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/176,685

(22) Filed: Mar. 1, 2023

(65) Prior Publication Data
US 2024/0147292 A1 May 2, 2024

Related U.S. Application Data

(60) Provisional application No. 63/381,076, filed on Oct. 26, 2022.

(51) Int. Cl.
*H04W 28/02* (2009.01)
*H04L 43/0829* (2022.01)
(Continued)

(52) U.S. Cl.
CPC ..... *H04W 28/0231* (2013.01); *H04L 43/0829* (2013.01); *H04L 43/0852* (2013.01); *H04L 43/0882* (2013.01)

(58) Field of Classification Search
CPC ........... H04W 28/0231; H04L 43/0829; H04L 43/0852; H04L 43/0882; H04L 67/1008;
(Continued)

(56) References Cited

U.S. PATENT DOCUMENTS

2019/0304133 A1* 10/2019 Bang .................... G06T 7/74
2023/0403596 A1* 12/2023 Pries .................... G06F 3/011
2024/0129950 A1* 4/2024 Kwok ................. H04W 72/543

FOREIGN PATENT DOCUMENTS

WO   2022089713 A1   5/2022
WO   2022188726 A1   9/2022

OTHER PUBLICATIONS

3GPP TR 26.998: "3rd Generation Partnership Project, Technical Specification Group SA, Support of 5G Glass-type Augmented Reality Mixed Reality (AR/MR) devices, (Release 17)", 3GPP standard, Technical Report, 3rd Generation Partnership Project, Mobile Competence Centre, 650, Route Des Lucioles, F-06921 Sophia-Antipolis Cedex, France, No. V2.0.0, Mar. 31, 2022, pp. 1-120, XP052145100, Section 4.2.2.4.
(Continued)

*Primary Examiner* — Shawn D Miller
(74) *Attorney, Agent, or Firm* — Harrity & Harrity, LLP

(57) ABSTRACT

Various aspects of the present disclosure generally relate to wireless communication. In some aspects, a user equipment (UE) may determine, based at least in part on one or more parameters, an extended reality (XR) compute location for XR data associated with an XR device that is associated with the UE, wherein the XR compute location corresponds to the UE, the XR device, or an application server associated with the XR data. The UE may selectively transmit an indication of the XR compute location to a network node. Numerous other aspects are described.

28 Claims, 19 Drawing Sheets

(51) Int. Cl.
*H04L 43/0852* (2022.01)
*H04L 43/0882* (2022.01)

(58) Field of Classification Search
CPC ............. H04L 41/5054; H04L 43/0817; H04L 43/0864; H04L 67/131; G06F 3/011
See application file for complete search history.

(56) References Cited

OTHER PUBLICATIONS

Alshahrani A., et al., "Efficient Multi-Player Computation Offloading for VR Edge-Cloud Computing Systems", Applied Sciences, vol. 10, No. 16, Aug. 10, 2020, pp. 1-19, XP055824954, p. 5515, Item 4, p. 6-p. 12.
International Search Report and Written Opinion—PCT/US2023/074751—ISA/EPO—Dec. 8, 2023.

* cited by examiner

DYNAMIC DISTRIBUTED EXTENDED REALITY COMPUTE

CROSS-REFERENCE TO RELATED APPLICATION

This Patent application claims priority to U.S. Provisional Patent Application No. 63/381,076, filed on Oct. 26, 2022, entitled "DYNAMIC DISTRIBUTED EXTENDED REALITY COMPUTE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic distributed extended reality compute.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to determine, based at least in part on one or more parameters, an extended reality (XR) compute location for XR data associated with an XR device that is associated with the UE, where the XR compute location corresponds to the UE, the XR device, or an application server associated with the XR data. The one or more processors may be configured to selectively transmit an indication of the XR compute location to a network node.

Some aspects described herein relate to an XR device for wireless communication. The XR device may include a memory and one or more processors coupled to the memory. The one or more processors may be configured to determine, based at least in part on one or more parameters, an XR compute location for XR data associated with the XR device, where the XR compute location corresponds to the XR device, a UE associated with the XR device, or an application server associated with the XR data. The one or more processors may be configured to selectively transmit an indication of the XR compute location to a network node.

Some aspects described herein relate to an application server for wireless communication. The application server may include a memory and one or more processors coupled to the memory. The one or more processors may be configured to determine, based at least in part on one or more parameters, an XR compute location for XR data associated with an XR device, where the XR compute location corresponds to the XR device, a UE associated with the XR device, or an application server associated with the XR data. The one or more processors may be configured to selectively switch the XR compute location based at least in part on determining the XR compute location.

Some aspects described herein relate to a non-transitory computer-readable medium that stores a set of instructions for wireless communication by a UE. The set of instructions, when executed by one or more processors of the UE, may cause the UE to determine, based at least in part on one or more parameters, an XR compute location for XR data associated with an XR device that is associated with the UE, where the XR compute location corresponds to the UE, the XR device, or an application server associated with the XR data. The set of instructions, when executed by one or more processors of the UE, may cause the UE to selectively transmit an indication of the XR compute location to a network node.

Some aspects described herein relate to a non-transitory computer-readable medium that stores a set of instructions for wireless communication. The set of instructions, when executed by one or more processors of an XR device, may cause the XR device to determine, based at least in part on one or more parameters, an XR compute location for XR data associated with the XR device, where the XR compute location corresponds to the XR device, a UE associated with the XR device, or an application server associated with the XR data. The set of instructions, when executed by one or more processors of the XR device, may cause the XR device to selectively transmit an indication of the XR compute location to a network node.

Some aspects described herein relate to a non-transitory computer-readable medium that stores a set of instructions for wireless communication that, when executed by one or more processors of an application server, may cause the application server to determine, based at least in part on one or more parameters, an XR compute location for XR data associated with an XR device, where the XR compute location corresponds to the XR device, a UE associated with the XR device, or an application server associated with the XR data. The set of instructions, when executed by one or more processors of the application server, may cause the application server to selectively switch the XR compute location based at least in part on determining the XR compute location.

Some aspects described herein relate to an apparatus for wireless communication. The apparatus may include means for determining, based at least in part on one or more parameters, an XR compute location for XR data associated with an XR device that is associated with the apparatus, where the XR compute location corresponds to the apparatus, the XR device, or an application server associated with the XR data. The apparatus may include means for selectively transmitting an indication of the XR compute location to a network node.

Some aspects described herein relate to an apparatus for wireless communication. The apparatus may include means for determining, based at least in part on one or more parameters, an XR compute location for XR data associated with the apparatus, where the XR compute location corresponds to the apparatus, a UE associated with the apparatus, or an application server associated with the XR data. The apparatus may include means for selectively transmitting an indication of the XR compute location to a network node.

Some aspects described herein relate to an apparatus for wireless communication. The apparatus may include means for determining, based at least in part on one or more parameters, an XR compute location for XR data associated with an XR device, where the XR compute location corresponds to the XR device, a UE associated with the XR device, or the apparatus associated. The apparatus may include means for selectively switching the XR compute location based at least in part on determining the XR compute location.

Some aspects described herein relate to a method of wireless communication performed by a UE. The method may include determining, based at least in part on one or more parameters, an XR compute location for XR data associated with an XR device that is associated with the UE, where the XR compute location corresponds to the UE, the XR device, or an application server associated with the XR data. The method may include selectively transmitting an indication of the XR compute location to a network node.

Some aspects described herein relate to a method of wireless communication performed by an XR device. The method may include determining, based at least in part on one or more parameters, an XR compute location for XR data associated with the XR device, where the XR compute location corresponds to the XR device, a UE associated with the XR device, or an application server associated with the XR data. The method may include selectively transmitting an indication of the XR compute location to a network node.

Some aspects described herein relate to a method of wireless communication performed by an application server. The method may include determining, based at least in part on one or more parameters, an XR compute location for XR data associated with an XR device, where the XR compute location corresponds to the XR device, a UE associated with the XR device, or an application server associated with the XR data. The method may include selectively switching the XR compute location based at least in part on determining the XR compute location.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
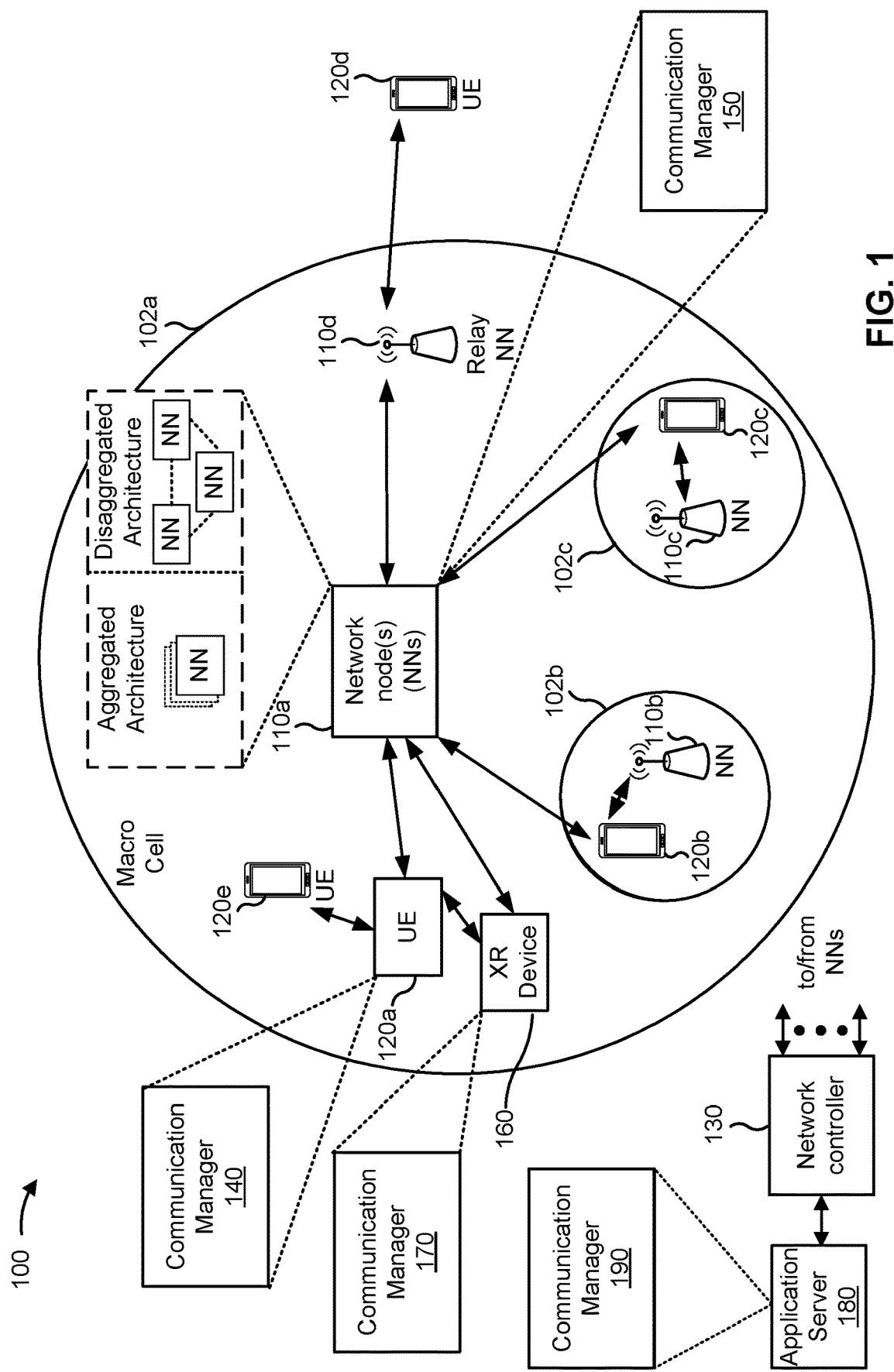
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (MC), or a Non-Real Time (Non-RT) MC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, the wireless network 100 may include an extended reality (XR) device 160. For example, an XR device 160 may communicate with a network node 110 (e.g., via an access link) and/or a UE 120 (e.g., via a sidelink). In some examples, an XR device 160 may be an example of a UE 120. In other words, some UEs 120 may be XR devices 160. XR functionalities may include augmented reality (AR), virtual reality (VR), or mixed reality (MR), among other examples. For example, when providing an XR service, the XR device 160 may provide rendered data via a display, such as a screen, a set of VR goggles, a heads-up display, or another type of display. The XR device 160 may be an augmented reality (AR) glasses device, a virtual reality (VR) glass device, or other gaming device.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE 120 may include a communication manager 140. As described in more detail elsewhere herein, the communication manager 140 may determine, based at least in part on one or more parameters, an XR compute location for XR data associated with an XR device 160 that is associated with the UE 120; and selectively transmit an indication of the XR compute location to a network node 110. Additionally, or alternatively, the communication manager 140 may perform one or more other operations described herein.

In some aspects, a network node 110 may include a communication manager 150. As described in more detail elsewhere herein, the communication manager 150 may receive an indication of an XR compute location associated with an XR device 160; and may provide the indication of the XR compute location to an application server 180. Additionally, or alternatively, the communication manager 150 may perform one or more other operations described herein.

In some aspects, an XR device 160 may include a communication manager 170. As described in more detail elsewhere herein, the communication manager 170 may determine, based at least in part on one or more parameters, an XR compute location for XR data associated with the XR device 160; and selectively transmit an indication of the XR compute location to a network node 110. Additionally, or alternatively, the communication manager 170 may perform one or more other operations described herein.

As further shown in FIG. 1, an application server 180 may couple to or communicate with one or more network controllers 130. The application server 180 may host an application such as a gaming application, a video streaming application, an XR, VR, or AR application, and/or another type of application for which communication flows of streaming data are provided between a UE 120 and the application server 180, between an XR device 160 and the application server 180, and/or between the application server 180 and another device in the wireless network 100. The application server 180 may be included in an edge server, a cloud environment, and/or another type of server environment. A UE 120 and/or an XR device 160 may execute an application client associated with the application hosted by the application server, such as a gaming application client, a video streaming application client, an XR, VR, or AR application client, and/or another type of application client.

In some aspects, an application server 180 may include a communication manager 190. As described in more detail elsewhere herein, the communication manager 190 may determine, based at least in part on one or more parameters, an XR compute location for XR data associated with an XR device 160; and selectively switch the XR compute location based at least in part on determining the XR compute location. Additionally, or alternatively, the communication manager 190 may perform one or more other operations described herein.

As indicated above, FIG. 1 is provided as an example. Other examples may differ from what is described with regard to FIG. 1.

Figure 2:
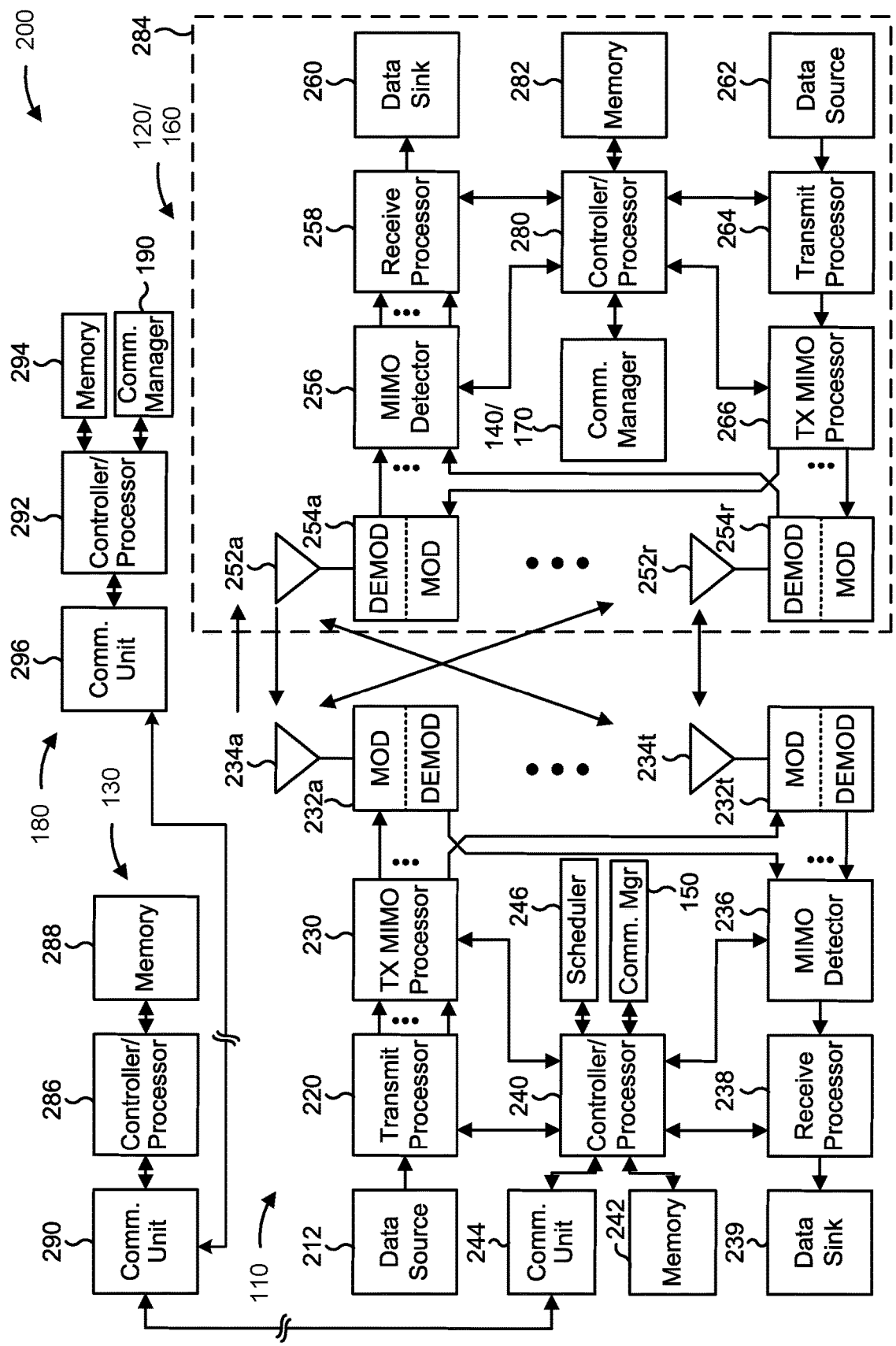
FIG. 2 is a diagram illustrating an example of a network node in communication with a user equipment (UE) or an extended reality (XR) device in a wireless network, in accordance with the present disclosure.

FIG. 2 is a diagram illustrating an example 200 of a network node 110 in communication with a UE 120 or an XR device 160 in a wireless network 100, in accordance with the present disclosure. The network node 110 may further communicate with a network controller 130 and an application server 180 via the network controller 130. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120, the XR device 160, or another network node. Some network nodes 110 may not include radio frequency components that facilitate direct communication with the UE 120 or the XR device 160, such as one or more CUs, or one or more DUs.

At the network node 110, a transmit processor 220 may receive data, from a data source 212, intended for the UE 120 or the XR device 160 (or a set of UEs 120 or a set of XR devices 160). The transmit processor 220 may select one or more modulation and coding schemes (MCSs) for the UE 120 or the XR device 160 based at least in part on one or more channel quality indicators (CQIs) received from that UE 120 or the XR device 160. The network node 110 may process (e.g., encode and modulate) the data for the UE 120 or the XR device 160 based at least in part on the MCS(s) selected for the UE 120 or the XR device 160 and may provide data symbols for the UE 120 or the XR device 160. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120 or the XR device 160, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 or the XR device 160 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 or the XR device 160 may be included in a housing 284.

The network controller 130 may include a communication unit 290, a controller/processor 286, and a memory 288. The network controller 130 may include, for example, one or more devices in a core network. The network controller 130 may communicate with the network node 110 and/or the application server 180 via the communication unit 290.

The application server 180 may include a communication unit 296, a controller/processor 292, and a memory 294. In some aspects, the application server 180 includes the communication manager 190. The application server 180 may communicate with the network controller 130 via the communication unit 296.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120 or the XR device 160, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 or the XR device 160 may include a modulator and a demodulator. In some examples, the UE 120 or the XR device 160 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-16).

At the network node 110, the uplink signals from UE 120 or the XR device 160 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120 or the XR device 160. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-16).

The controller/processor 240 of the network node 110, the controller/processor 280 of the UE 120 or the XR device 160, and/or any other component(s) of FIG. 2 may perform one or more techniques associated with dynamic distributed XR compute, as described in more detail elsewhere herein. For example, the controller/processor 240 of the network node 110, the controller/processor 280 of the UE 120 or the XR device 160, and/or any other component(s) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the network node 110 and the UE 120 or the XR device 160, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120 or the XR device 160, may cause the one or more processors, the UE 120 or the XR device 160, and/or the network node 110 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for determining, based at least in part on one or more parameters, an XR compute location for XR data associated with an XR device 160 that is associated with the UE 120, where the XR compute location corresponds to the UE 120, the XR device 160, or an application server 180 associated with the XR data; and/or means for selectively transmitting an indication of the XR compute location to a network node 110. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the XR device 160 includes means for determining, based at least in part on one or more parameters, an XR compute location for XR data associated with the XR device 160, where the XR compute location corresponds to the XR device 160, a UE 120 associated with the XR device 160, or an application server associated with the XR data; and/or means for selectively transmitting an indication of the XR compute location to a network node 110. In some aspects, the means for the XR device 160 to perform operations described herein may include, for example, one or more of communication manager 170, antenna 252, modem 254, MIMO detector 256, receive processor 258, transmit processor 264, TX MIMO processor 266, controller/processor 280, or memory 282.

In some aspects, the application server 180 includes means for determining, based at least in part on one or more parameters, an XR compute location for XR data associated with an XR device 160, where the XR compute location corresponds to the XR device 160, a UE 120 associated with the XR device 160, or an application server 180 associated with the XR data; and/or means for selectively switching the XR compute location based at least in part on determining the XR compute location. In some aspects, the means for the application server 180 to perform operations described herein may include, for example, one or more of communication manager 190, controller/processor 292, memory 294, communication unit 296.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station (BS), a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
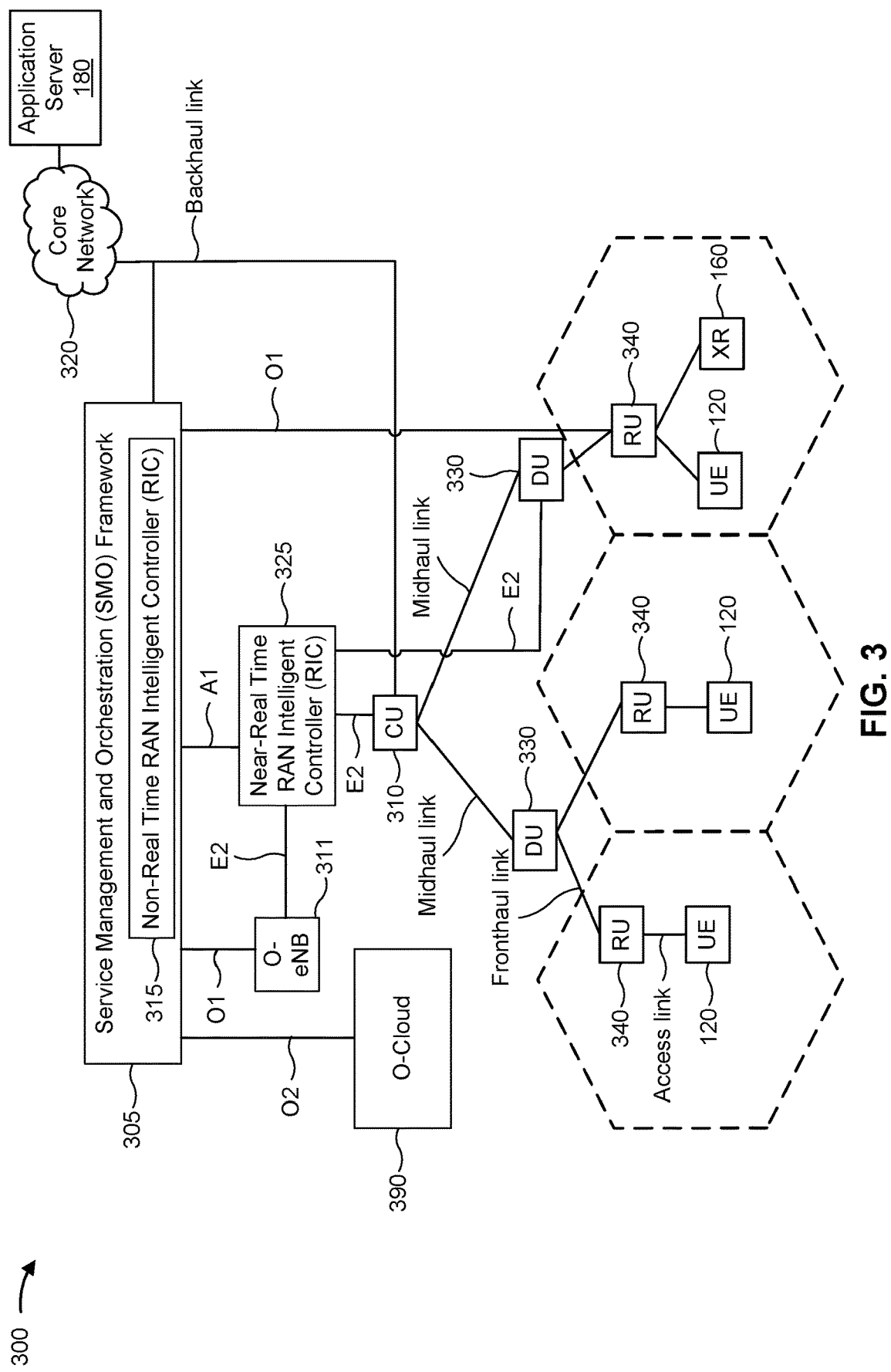
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 or XR devices 160 via respective radio frequency (RF) access links. In some implementations, a UE 120 or an XR device 160 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120 or XR devices 160. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT MC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT MC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
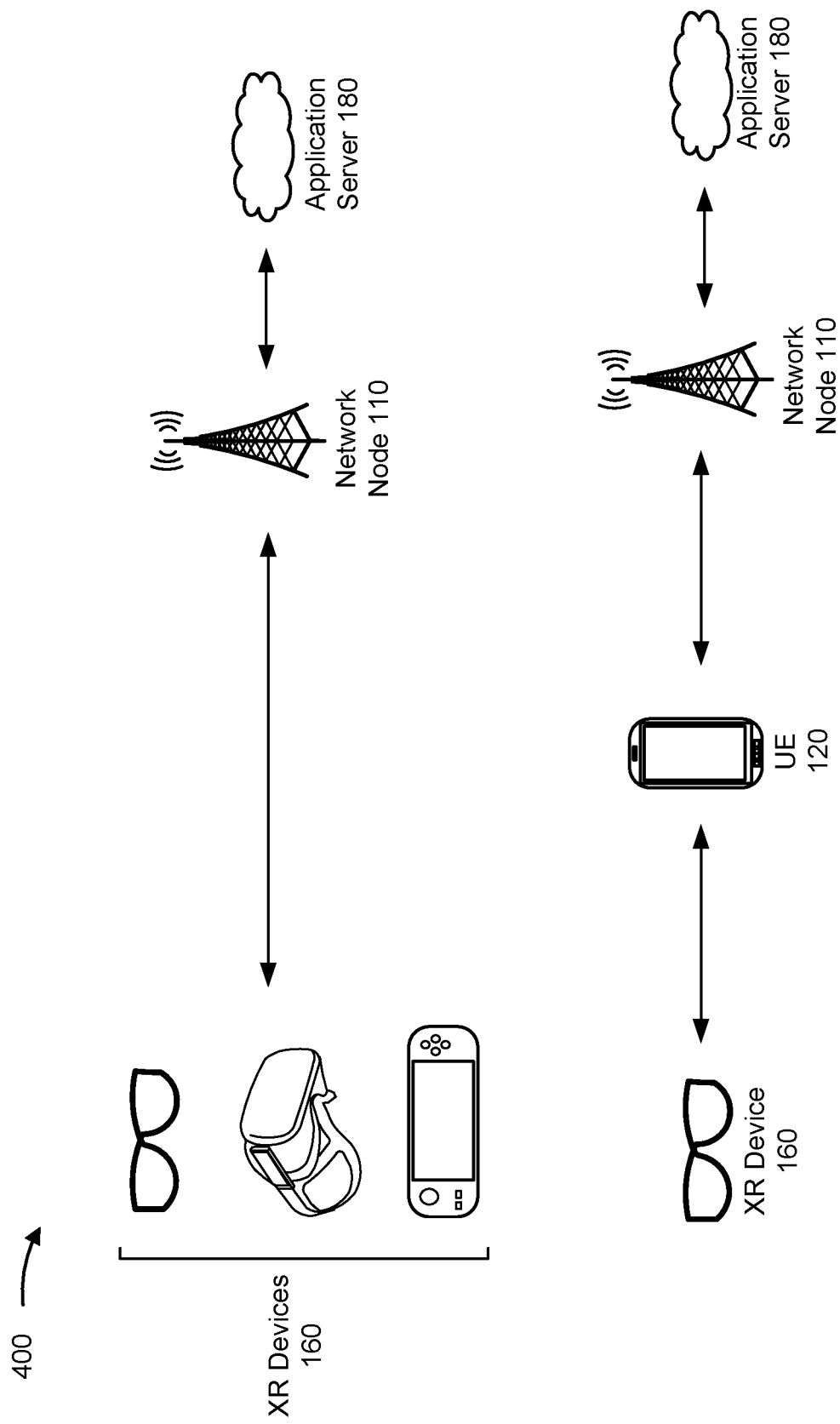
FIG. 4 is a diagram illustrating an example of devices designed for XR traffic applications, in accordance with the present disclosure.

FIG. 4 is a diagram illustrating an example 400 of devices designed for XR traffic applications, in accordance with the present disclosure. As shown in FIG. 4, an XR device 160 may communicate with an application server 180.

In some aspects, the XR device 160 communicates with the application server 180 through a UE 120 that communicates with a network node 110 in a wireless network 100. Here, the UE 120 may be communicatively connected with the XR device 160 by a wired (e.g., universal serial bus (USB), serial ATA (SATA)) and/or a wireless (e.g., Bluetooth, Wi-Fi, 5G) connection.

In some aspects, the XR device 160 communicates with the application server 180 without the use of an intermediate UE 120. Here, the XR device 160 communicates wirelessly with a network node 110 in the wireless network 100 to communicate with the application server 180.

As indicated above, an application server 180 may host an application (e.g., an XR application or an application that has XR support). A UE 120 or an XR device 160 may execute an application client that communicates with the application hosted by the application server 180. Applications for an XR device 160 (or for another type of gaming device such as a UE 120) may include a video game (e.g., where multimedia traffic is transferred to and from the application server 180 at a particular frame rate to support audio and/or video rendering) and/or a VR environment (e.g., where multimedia traffic is transferred to and from the application server 180 at a particular polling rate to support sensor input (e.g., 6 degrees of freedom (6DOF) sensor input and feedback), among other examples. Some applications, including applications for XR, VR, AR, and/or gaming, may require low-latency traffic to and from an edge server or a cloud environment. The traffic to and from the edge server or the cloud environment may be periodic, to support a particular frame rate (e.g., 120 frames per second (FPS), 90 FPS, 60 FPS), a particular refresh rate (e.g., 500 Hertz (Hz), 120 Hz), and/or a particular data transfer rate (e.g., 8 megabits per second (Mbps), 30 Mbps, 45 Mbps) for XR traffic applications.

As indicated above, FIG. 4 is provided as an example. Other examples may differ from what is described with regard to FIG. 4.

An application may be executed by an application processor of an associated UE and/or by an XR device. In some aspects, the XR device may have limited battery life and/or limited processing capabilities. In these aspects (and/or in other aspects), the UE may perform computations for the XR device so that the XR device may conserve processing and/or battery resources. The computations may include rendering XR data (e.g., rendering XR video, rendering XR audio), head tracking, hand tracking, and/or pose tracking, among other examples. Additionally and/or alternatively, rendering XR data for the XR device may be performed at the application server such that rendered XR data is provided to the XR device (either directly or via the UE). This may conserve processing and/or battery resources of the UE, in addition to conserving processing and/or battery resources of the XR device, and may improve rendering quality. Moreover, this may enable more resource-intensive computations such as rendering to be performed remotely while less resource-intensive and latency-sensitive computations such as hand/head tracking are performed locally at the UE and/or at the XR device.

However, offloading resource-intensive computations to the application server may result in increased latency in transferring XR data to the XR device or the UE due to propagation delay between the application server and an application client executed by the XR device or the UE. Moreover, poor radio conditions on a wireless communication link between a network node and the XR device or the UE may further increase the latency in transferring XR data and/or may result in dropped or unreceived XR data, thereby reducing the quality of video and/or audio rendered for the application client.

Some aspects described herein provide dynamic distributed XR compute. In some aspects described herein, resource-intensive XR computational tasks such as XR rendering may be dynamically distributed based at least in part on one or more parameters associated with an XR device 160 and/or a UE 120. In some aspects, other XR computational tasks may be dynamically distributed, such as head tracking, hand tracking, and/or pose tracking, among other examples. In some aspects, a UE 120 or an XR device 160 may determine a location at which XR data associated with the XR device 160 is to be rendered based at least in part on radio conditions between the UE 120 or the XR device 160 and a network node 110, based at least in part on power consumption of the XR device 160, the UE 120, and/or an application server 180, based at least in part on a radio condition prediction associated with the XR device 160 and/or the UE 120, and/or based at least in part on another parameter.

Determining an XR compute location for XR data, as described herein, refers to determining or selecting the device that is to perform the XR compute of the XR data. Thus, if the XR compute location is determined to be the UE 120, the UE 120 is to perform the XR compute of the XR data. Alternatively, if the XR compute location is determined to be the application server 180, the application server 180 is to perform the XR compute of the XR data.

In this way, the techniques described herein enable the location at which XR computation is to be performed for an XR device 160 to be dynamically changed based at least in part on various conditions that may impact the rendering quality, the latency, the power consumption of the XR device 160 and/or the UE 120, and/or the data rate of the transfer of the XR data. Accordingly, the techniques described herein may provide increased rendering quality for an application client of an XR device 160, may provide improved user experience for the XR device 160, and/or may increase or prolong the battery life of the XR device 160 and/or the UE 120, among other examples.

FIGS. 5A-5D are diagrams of examples of distributed XR compute, in accordance with the present disclosure. As shown in FIGS. 5A-5D, the examples of distributed XR compute may include an XR device 160, a UE 120, a network node 110, and/or an application server 180, among other examples.

Figure 5A:
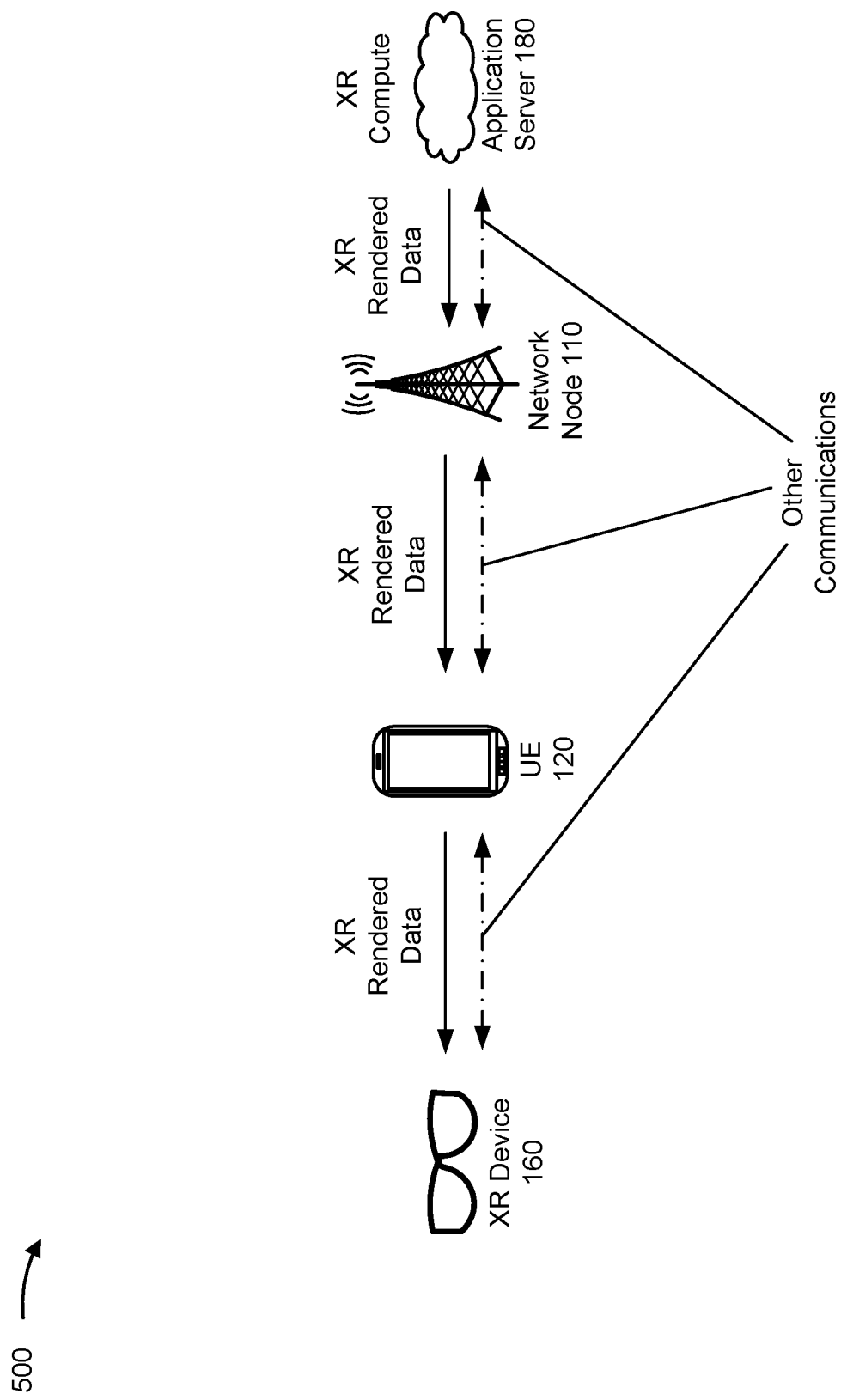
FIGS. 5A-5D are diagrams of examples of distributed XR compute, in accordance with the present disclosure.

FIG. 5A illustrates an example 500 of distributed XR compute. As shown in FIG. 5A, an XR device 160 may communicate with a UE 120. The UE 120 may communicate with a network node 110. The network node 110 may communicate with an application server 180. Accordingly, the XR device 160 may communicate with the application server 180 through the UE 120 and the network node 110, and the UE 120 may communicate with the application server 180 through the network node 110.

As further shown in FIG. 5A, XR compute of XR data (e.g., associated with an application hosted by the application server 180 and associated with an application client on the XR device 160 and/or on the UE 120) may be performed by the application server 180. The XR data may include raw video data (e.g., data that is to be used to generate a video stream), among other examples. Thus, in the example 500, the XR compute location is the application server 180. The application server 180 performs XR compute of the XR data, and provides XR rendered data (e.g., a rendered video stream, a rendered audio stream) to the XR device 160 through the network node 110 and through the UE 120. The UE 120 acts as a passthrough in that the UE 120 forwards or relays the XR rendered data to the XR device 160, which is tethered to the UE 120. The connection between the XR device 160 and the UE 120 need not be only tethering; other type of connections, such as Wi-Fi, may also be used.

Other types of communications, in addition to the XR rendered data, may be transmitted and received by the network node 110, the UE 120, the XR device 160, and/or the application server 180. For example, the application server 180 may provide, to the UE 120, aggregated application information and/or another type of application information that supports the XR compute of XR data at the UE 120. As another example, downlink communications and/or uplink communications may be exchanged by the network node 110, the UE 120, the XR device 160, and/or the application server 180.

Figure 5B:
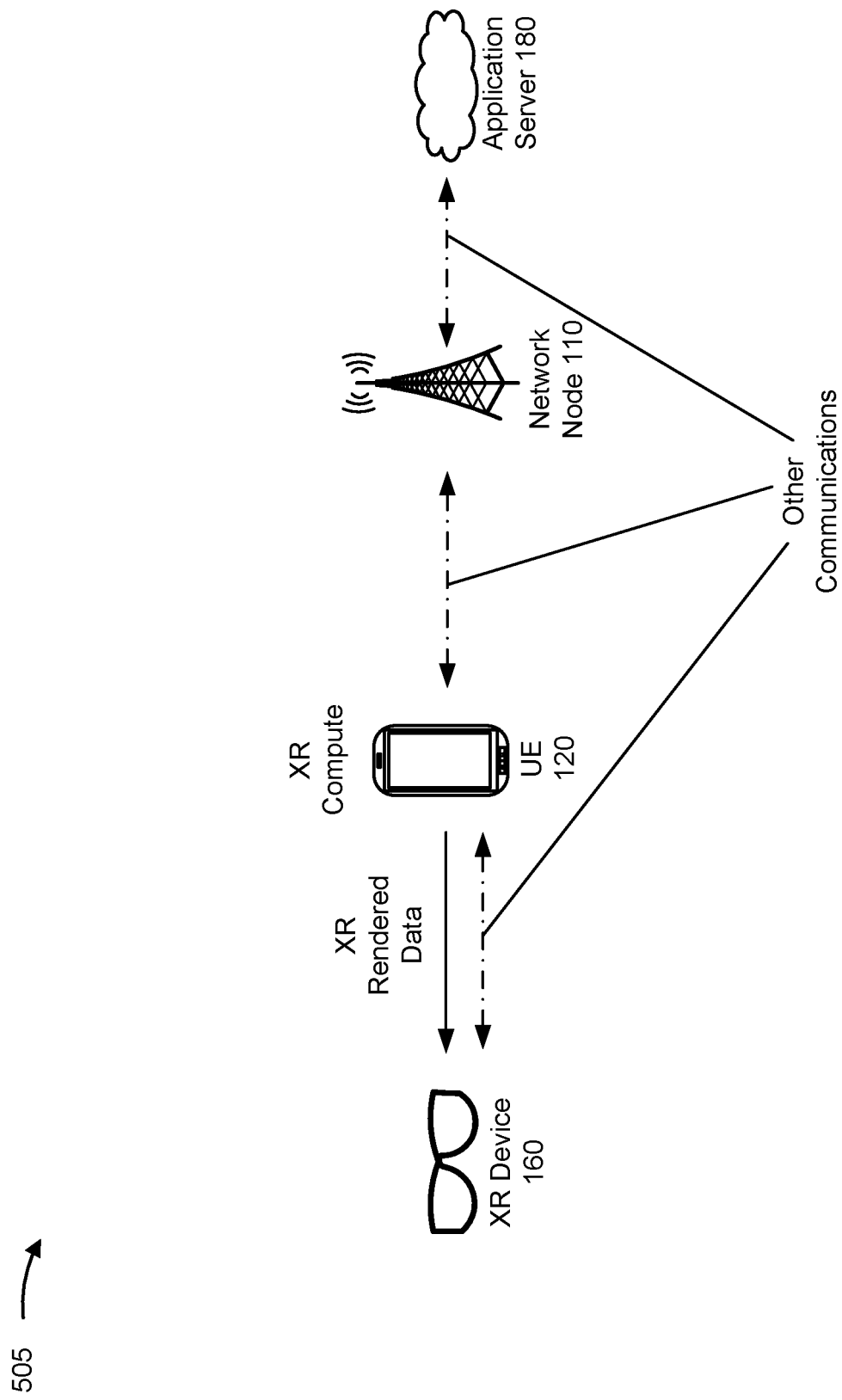

FIG. 5B illustrates another example 505 of distributed XR compute. An XR device 160 may communicate with a UE 120. The UE 120 may communicate with a network node 110. The network node 110 may communicate with an application server 180. Accordingly, the XR device 160 may communicate with the application server 180 through the UE 120 and the network node 110, and the UE 120 may communicate with the application server 180 through the network node 110.

As further shown in FIG. 5B, XR compute of XR data may be performed by the UE 120 associated with the XR device 160. Thus, in the example 505, the XR compute location is the UE 120. In some implementations, the application server 180 provides an indication to the UE 120 through the network node 110 to perform XR compute for the XR device 160. The UE 120 receives the indication and performs XR compute of the XR data. The UE 120 provides XR rendered data to the XR device 160.

While the XR rendered data is provided from the UE 120 to the XR device 160, other types of communications may be exchanged between the network node 110, the UE 120, the XR device 160, and/or the application server 180. For example, the application server 180 may provide, to the UE 120, aggregated application information and/or another type of application information that supports the XR compute of XR data at the UE 120. As another example, downlink communications and/or uplink communications may be exchanged by the network node 110, the UE 120, the XR device 160, and/or the application server 180.

Figure 5C:
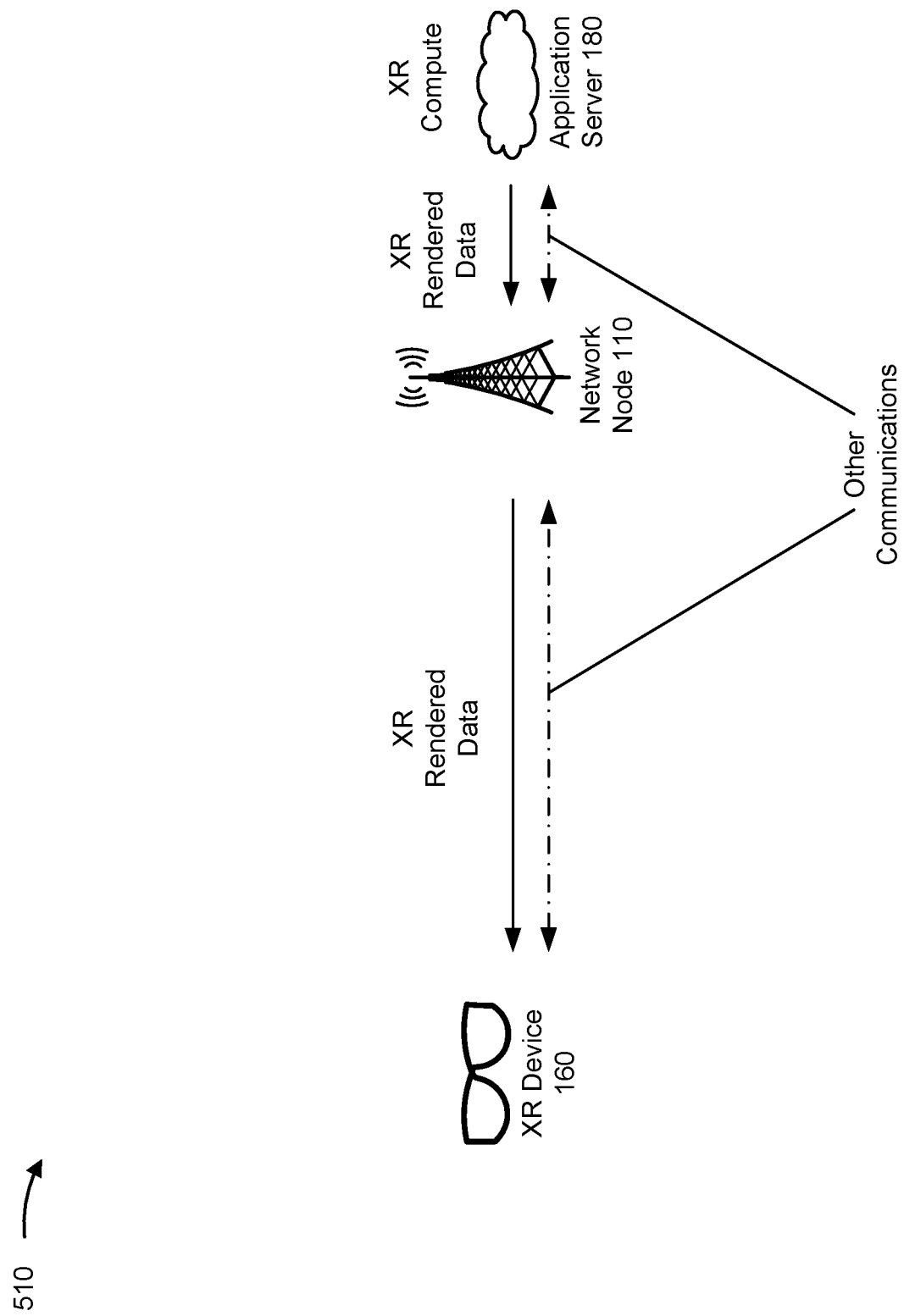

FIG. 5C illustrates another example 510 of distributed XR compute. As shown in FIG. 5C, an XR device 160 may communicate with an application server 180 through a network node 110. The XR device 160 may communicate directly with the network node 110 (e.g., without communicating through an associated UE 120).

As further shown in FIG. 5C, XR compute of XR data may be performed by the application server 180. Thus, in the example 510, the XR compute location is the application server 180. The application server 180 performs XR compute of the XR data, and provides XR rendered data to the XR device 160 through the network node 110.

Other types of communications, in addition to the XR rendered data, may be transmitted and received by the network node 110, the XR device 160, and/or the application server 180. For example, the application server 180 may provide, to the XR device 160, aggregated application information and/or another type of application information that supports the XR compute of XR data at the XR device 160. As another example, downlink communications and/or uplink communications may be exchanged by the network node 110, the XR device 160, and/or the application server 180.

Figure 5D:
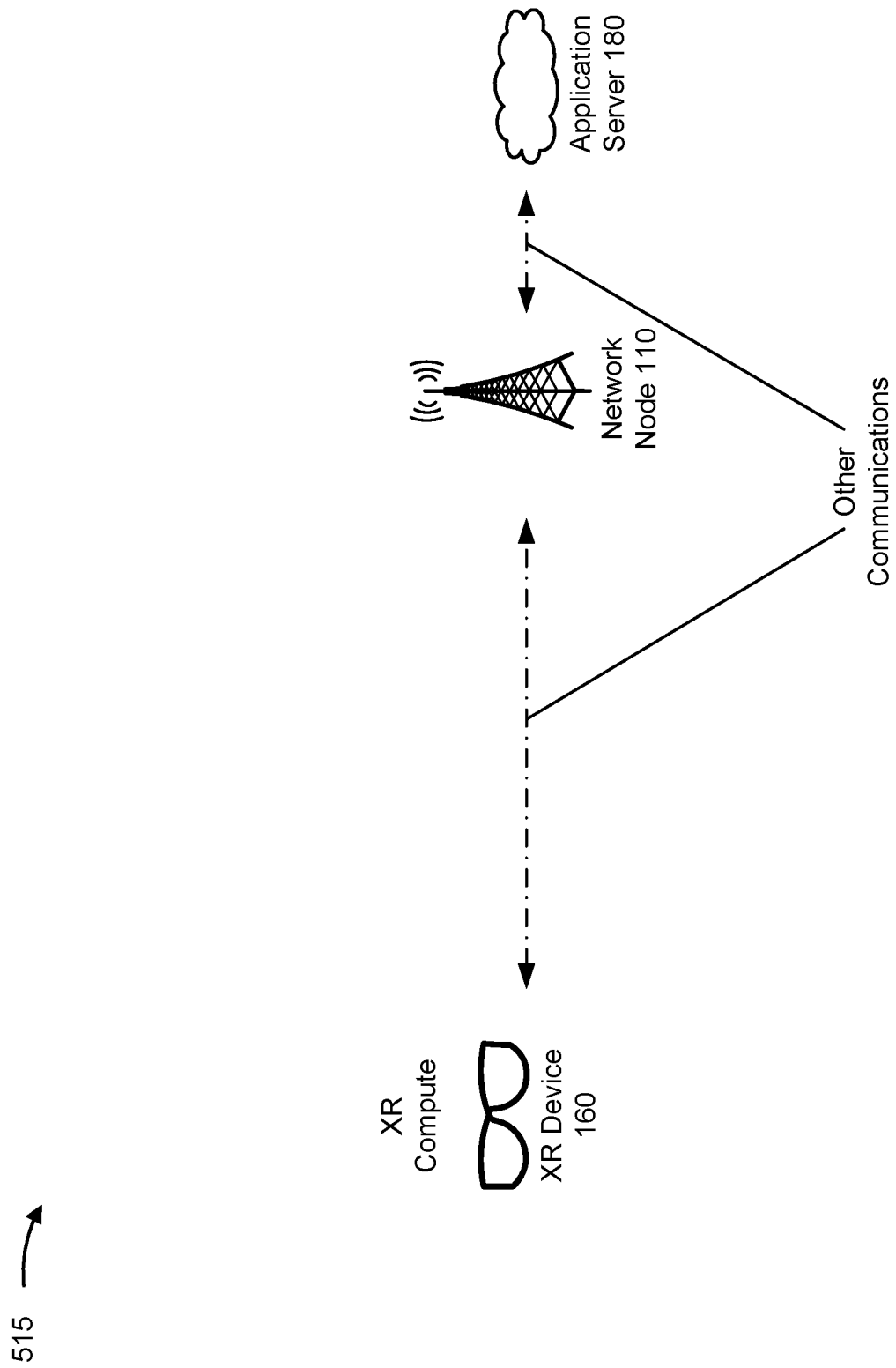

FIG. 5D illustrates another example 515 of distributed XR compute. An XR device 160 may communicate with an application server 180 through a network node 110. The XR device 160 may communicate directly with the network node 110 (e.g., without communicating through an associated UE 120).

As further shown in FIG. 5D, XR compute of XR data may be performed by the XR device 160. Thus, in the example 515, the XR compute location is the XR device 160. The application server 180 provides an indication to the XR device 160 through the network node 110 to perform XR compute for the XR device 160. The XR device 160 receives the indication from the application server 180 through the network node 110.

While the XR rendered data is generated at the XR device 160, other types of communications may be exchanged between the network node 110, the XR device 160, and/or the application server 180. For example, the application server 180 may provide, to the XR device 160, aggregated application information and/or another type of application information that supports the XR compute of XR data at the XR device 160. As another example, downlink communications and/or uplink communications may be exchanged by the network node 110, the XR device 160, and/or the application server 180.

As indicated above, FIGS. 5A-5D are provided as examples. Other examples may differ from what is described with regard to FIGS. 5A-5D.

Figure 6:
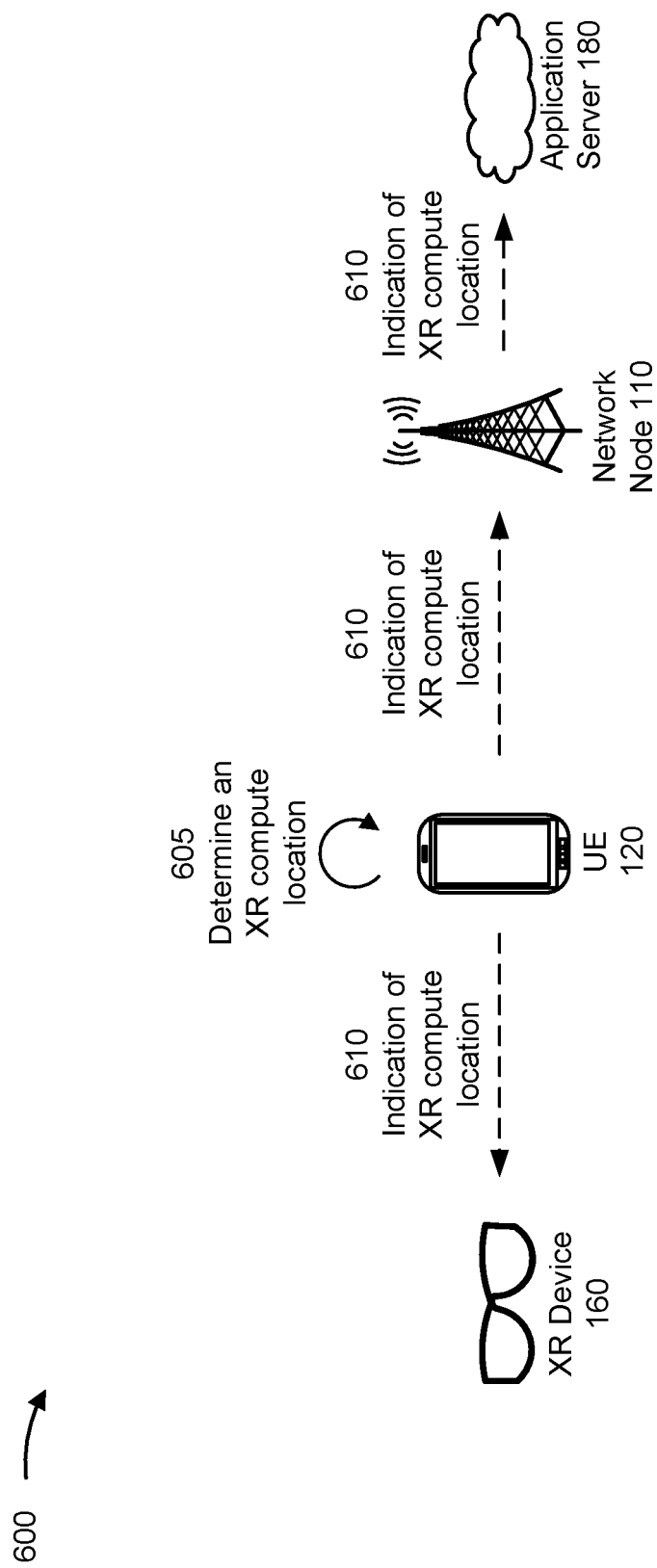
FIG. 6 is a diagram of an example of dynamic distributed XR compute, in accordance with the present disclosure.

FIG. 6 is a diagram of an example 600 of dynamic distributed XR compute, in accordance with the present disclosure. As shown in FIG. 6, the example 600 of dynamic distributed XR compute may include an XR device 160, a UE 120, a network node 110, and/or an application server 180, among other examples.

As described above, resource-intensive XR computational tasks such as XR rendering may be dynamically distributed based at least in part on one or more parameters associated with the XR device 160 and/or the UE 120, among other examples.

At 605, the UE 120 may determine an XR compute location at which XR data associated with the XR device 160 is to be rendered. As described above, determining an XR compute location for XR data refers to determining or selecting the device that is to perform the XR compute of the XR data. Thus, if the UE 120 determines the XR compute location is to be the UE 120, the UE 120 determines that the UE 120 is to perform the XR rendering (and other XR compute tasks) of the XR data for the XR device 160. This is referred to as "local rendering" or "local compute," and is illustrated in example 505 of FIG. 5B.

Alternatively, if the UE 120 determines the XR compute location to be the application server 180, the UE 120 determines that the application server 180 is to perform the XR compute of the XR data for the XR device 160. This is referred to as "remote rendering" or "remote compute," and is illustrated in the example 500 of FIG. 5A.

The UE 120 may determine the XR compute location based at least in part on radio conditions between the UE 120 and a network node 110 and/or between the XR device 160 and the network node 110, based at least in part on power consumption of the XR device 160 and/or the UE 120, based at least in part on a radio condition prediction associated with the XR device 160 and/or the UE 120, and/or based at least in part on another parameter.

The radio conditions between the UE 120 and a network node 110 may correspond to (or may be indicated by) one or more wireless radio parameters associated with the wireless radio link (e.g., the uplink and/or the downlink) between the UE 120 and the network node 110. The one or more wireless radio parameters may include an RSRP on the uplink and/or on the downlink, an RSSI on the uplink and/or on the downlink, an RSRQ on the uplink and/or on the downlink, and/or a CQI on the uplink and/or on the downlink, and/or an enhanced link capacity estimate (eLCE), among other examples. The wireless radio parameters may be based at least in part on input from a modem 254 of the UE 120 and/or based at least in part on another component of the UE 120.

The UE 120 may determine the XR compute location based at least in part on whether a wireless radio parameter satisfies a threshold. For example, the UE 120 may determine the XR compute location to be the application server 180 if an RSRP satisfies (e.g., exceeds, is equal to) an RSRP threshold. As another example, the UE 120 may determine the XR compute location to be the UE 120 if the RSRP does not satisfy (e.g., is less than, is equal to) the RSRP threshold.

As another example, the UE 120 may determine the XR compute location to be the application server 180 if an eLCE satisfies (e.g., exceeds, is equal to) an eLCE threshold. As another example, the UE 120 may determine the XR compute location to be the UE 120 if the eLCE does not satisfy (e.g., is less than, is equal to) the eLCE threshold. The eLCE may refer to an estimated available capacity on the wireless radio link between the UE 120 and the network node 110. The eLCE threshold may be based at least in part on a required bit rate for the application hosted by the application server 180 and the associated application client on the XR device 160 and/or the UE 120. For example, the UE 120 may determine the eLCE threshold to be based at least in part on an approximately 8 Mbps bitrate for a cloud gaming application. As another example, the UE 120 may determine the eLCE threshold to be based at least in part on an approximately 30 Mbps bitrate for an AR application. As another example, the UE 120 may determine the eLCE threshold to be based at least in part on an approximately 45 Mbps bitrate for a VR application.

The radio condition prediction associated with the XR device 160 and/or the UE 120 may include one or more sensor-based perceptions of the XR device 160 and/or the UE 120, may include one or more RF-based measurement perceptions of the XR device 160 and/or the UE 120, and/or other perceptions of the XR device 160 and/or the UE 120. The radio condition prediction enables a fusion of RF measurements, camera and sensor perceptions to enable the modem 254 of the UE 120 to detect early sudden radio changes that might occur based at least in part on a wireless radio link blockage, a change in an RF environment of the UE 120, and/or based at least in part on another radio condition change that might not otherwise be perceptible based on wireless radio measurements.

The power consumption of the UE 120 and/or the XR device 160 may include an estimated power consumption of the UE 120 and/or of the XR device 160 for different XR compute locations. As an example, the UE 120 may determine a first estimated power consumption (P_local) of the UE 120 if the XR compute location were the UE 120 (e.g., if the UE 120 were to perform the XR compute for the XR device 160) and a second estimated power consumption (P_remote) of the UE 120 if the XR compute location were the application server 180 (e.g., if the application server 180 were to perform the XR compute for the XR device 160). The UE 120 may determine the XR compute location to be the UE 120 if the second estimated power consumption is greater than the first estimated power consumption (e.g., if P_remote>P_local). Alternatively, the UE 120 may determine the XR compute location to be the application server 180 if the first estimated power consumption is greater than the second estimated power consumption (e.g., if P_remote<P_local).

An estimated power consumption may include a combination of an estimated wireless radio power consumption (P_radio) of the UE 120 and an estimated XR compute power consumption (P_compute) of the UE 120. The estimated wireless radio power consumption may be a peak wireless radio power consumption, an average wireless radio power consumption, or a combination thereof. The UE 120 may determine the estimated wireless radio power consumption based at least in part on information provided by the modem 254 of the UE 120, which may include data rates, transmit power, device delay period, and/or channel utilization, among other parameters.

The estimated XR compute power consumption may be a peak XR compute power consumption, an average XR compute power consumption, or a combination thereof. The UE 120 may determine the estimated XR compute power consumption based at least in part on a type of compute tasks that are to be performed for XR compute, and/or historical measurements of power consumption for the compute tasks for the controller/processor 280 of the UE 120 (e.g., the central processing unit (CPU) of the UE 120, the graphics processing unit (GPU) of the UE 120).

The UE 120 may determine an estimated power consumption (e.g., P_local, P_remote) based at least in part on the estimated wireless radio power consumption and the estimated XR compute power consumption (e.g., P_radio+ P_compute). In particular, the UE 120 may determine the first estimated power consumption as P_local=P_radio_local+P_compute_local, and may determine the second estimated power consumption as P_remote=P_radio_remote+P_compute_remote.

In some aspects, the UE 120 may determine the XR compute location based at least in part on other parameters, such as a packet loss rate between the application client at the XR device 160 and the network node 110, a round trip time (RTT) between the application client at the XR device 160 and the network node 110, a server load associated with the application server 180, and/or a network load associated with the network node 110, among other examples.

For example, the UE 120 may determine the XR compute location to be the UE 120 if the packet loss rate satisfies (e.g., exceeds, is equal to) a package loss rate threshold. As another example, the UE 120 may determine the XR compute location to be the application server 180 if the packet loss rate does not satisfy (e.g., is less than, is equal to) the package loss rate threshold.

As another example, the UE 120 may determine the XR compute location to be the UE 120 if the RTT satisfies (e.g., exceeds, is equal to) an RTT threshold. As another example, the UE 120 may determine the XR compute location to be the application server 180 if the RTT does not satisfy (e.g., is less than, is equal to) the RTT threshold.

As another example, the UE 120 may determine the XR compute location to be the UE 120 if the server load satisfies (e.g., exceeds, is equal to) a server load threshold. As another example, the UE 120 may determine the XR compute location to be the application server 180 if the server load does not satisfy (e.g., is less than, is equal to) the server load threshold. Generally, the greater the server load, the fewer the resources that are available to be allocated to the UE 120, which may result in increased delays even if radio conditions on the wireless radio link between the UE 120 and the network node 110 are satisfactory.

As another example, the UE 120 may determine the XR compute location to be the UE 120 if the network load satisfies (e.g., exceeds, is equal to) a network load threshold. As another example, the UE 120 may determine the XR compute location to be the application server 180 if the network load does not satisfy (e.g., is less than, is equal to) the network load threshold. Generally, the greater the network load, the fewer the resources that are available to be allocated to the UE 120, which may result in increased delays even if radio conditions on the wireless radio link between the UE 120 and the network node 110 are satisfactory.

In some aspects, the UE 120 may determine the XR compute location based at least in part on a combination of the above-described parameters (and/or other parameters). For example, the UE 120 may assign appropriate weights to one or more of the parameters and may determine the XR compute location based at least in part on the weighted parameters. As an example, even if radio conditions on the wireless radio link between the UE 120 at the network node 110 degrade, the UE 120 may still maintain the XR compute location to be the application server 180 if power consumption at the UE 120 is greater if the UE 120 performs the XR compute than the power consumption at the UE 120 if the application server 180 performs the XR compute (e.g., if (P_remote<P_local).

As further shown in FIG. 6, at 610, the UE 120 may selectively transmit an indication of the XR compute location to one or more devices, such as the application server 180 and/or the XR device 160. The UE 120 may selectively transmit the indication of the XR compute location to the application server 180 through the network node 110. The UE 120 may selectively transmit an indication of the XR compute location to the application server 180 in that, in some aspects, the UE 120 transmits the indication of the XR compute location if the XR compute location determined by the UE 120 is different from the current XR compute location. Otherwise, the UE 120 may refrain from transmitting the indication of the XR compute location if the XR compute location determined by the UE 120 is the same as the current XR compute location (e.g., if the XR compute location is unchanged).

For example, if the current XR compute location is the UE 120, and the UE 120 determines that the XR compute location is to be the application server 180, the UE 120 may transmit the indication of the XR compute location to the application server 180. This enables the application server 180 to switch the XR compute location from the UE 120 to the application server 180. As another example, if the current XR compute location is the application server 180, and the UE 120 determines that the XR compute location is to be the UE 120, the UE 120 may transmit the indication of the XR compute location to the application server 180. This enables the application server 180 to switch the XR compute location from the application server 180 to the UE 120.

As another example, if the current XR compute location is the UE 120, and the UE 120 determines that the XR compute location is to be the UE 120, the UE 120 may refrain from transmitting the indication of the XR compute location to the application server 180, as the application server 180 does not need to change the XR compute location. This reduces consumption of processing and memory resources of the UE 120 and the network node 110, as well as reduces consumption of wireless radio link resources between the UE 120 and the network node 110. As another example, if the current XR compute location is the application server 180, and the UE 120 determines that the XR compute location is to be the application server 180, the UE 120 may refrain from transmitting the indication of the XR compute location to the application server 180.

Alternatively, the UE 120 may transmit the indication of the XR compute location to the application server 180 even if the XR compute location determined by the UE 120 is the same as the current XR compute location.

As indicated above, FIG. 6 is provided as an example. Other examples may differ from what is described with regard to FIG. 6.

Figure 7:
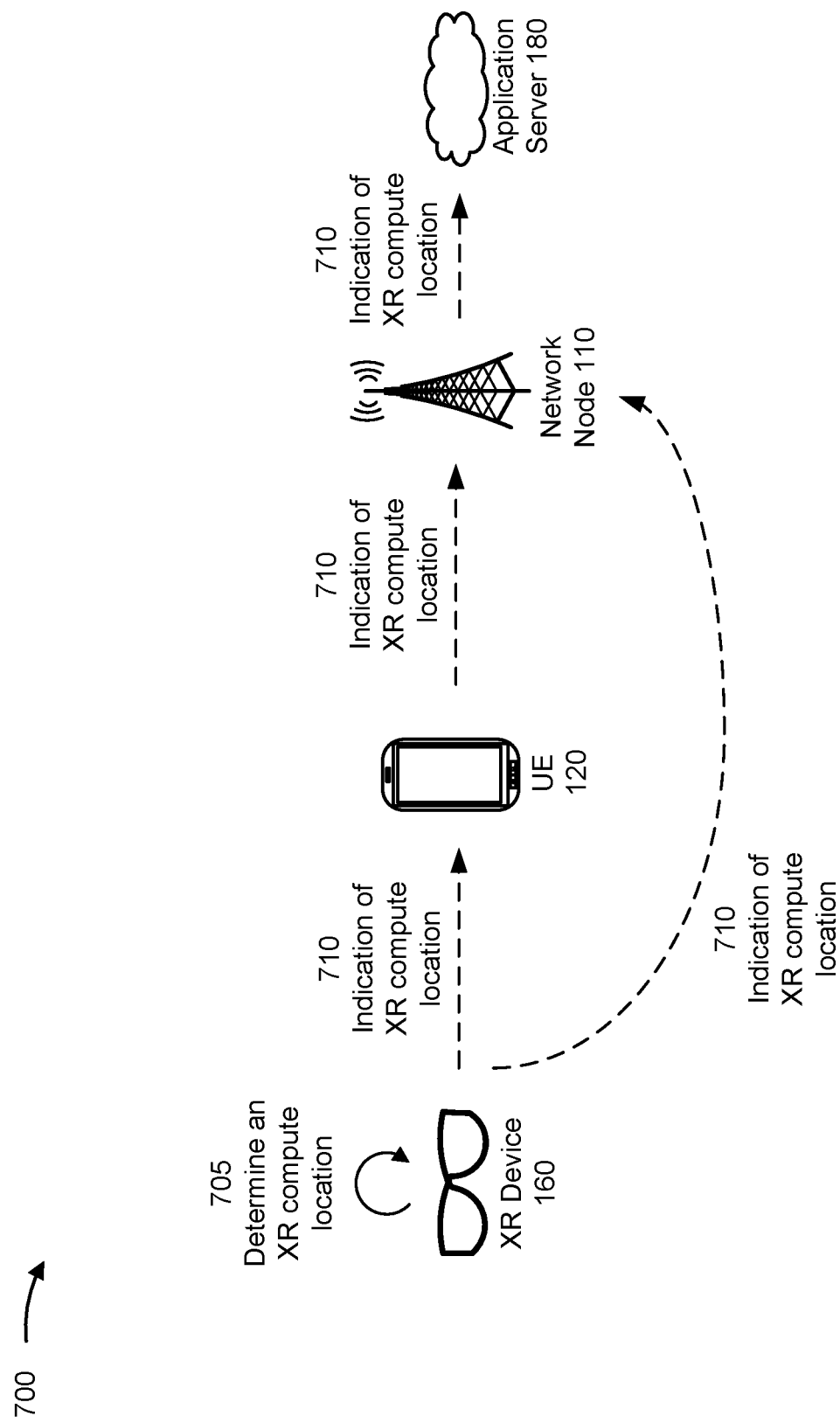
FIG. 7 is a diagram of an example of dynamic distributed XR compute, in accordance with the present disclosure.

FIG. 7 is a diagram of an example 700 of dynamic distributed XR compute, in accordance with the present disclosure. As shown in FIG. 7, the example 700 of dynamic distributed XR compute may include an XR device 160, a UE 120, a network node 110, and/or an application server 180, among other examples. In some aspects, the UE 120 may be omitted, and the XR device 160 may communicate directly with the network node 110 to communicate with the application server 180.

As described above, resource-intensive XR computational tasks such as XR rendering may be dynamically distributed based at least in part on one or more parameters associated with the XR device 160 and/or the UE 120, among other examples.

At 705, the XR device 160 may determine an XR compute location at which XR data associated with the XR device 160 is to be rendered. The XR device 160 may use similar techniques as described above in connection with FIG. 6 to determine the XR compute location. If XR device 160 determines that the XR compute location is to be the UE 120, the XR device 160 determines that the UE 120 is to perform the XR compute of the XR data for the XR device 160. This is referred to as "local rendering" or "local compute," and is illustrated in example 505 of FIG. 5B.

Alternatively, if XR device 160 determines the XR compute location to be the XR device 160, the XR device 160 determines that the XR device 160 is to perform the XR compute of the XR data for the XR device 160. This may also be referred to as "local rendering" or "local compute," and is illustrated in example 505 of FIG. 5D.

Alternatively, if the XR device 160 determines the XR compute location to be the application server 180, the XR device 160 determines that the application server 180 is to perform the XR compute of the XR data for the XR device 160. This is referred to as "remote rendering" or "remote compute," and is illustrated in the example 500 of FIG. 5A and in the example 510 of FIG. 5C.

As further shown in FIG. 7, at 710, the XR device 160 may selectively transmit an indication of the XR compute location to the application server 180. In some aspects, XR device 160 may selectively transmit the indication of the XR compute location to the application server 180 through the network node 110 (e.g., without transmitting the indication of the XR compute location through the UE 120). In some aspects, XR device 160 may selectively transmit the indication of the XR compute location to the application server 180 through the UE 120 and the network node 110.

The XR device 160 may selectively transmit an indication of the XR compute location to the application server 180 in that, in some aspects, the XR device 160 transmits the indication of the XR compute location if the XR compute location determined by the XR device 160 is different from the current XR compute location. Otherwise, the XR device 160 may refrain from transmitting the indication of the XR compute location if the XR compute location determined by the XR device 160 is the same as the current XR compute location (e.g., if the XR compute location is unchanged).

For example, if the current XR compute location is the XR device 160, and the XR device 160 determines that the XR compute location is to be the application server 180, the XR device 160 may transmit the indication of the XR compute location to the application server 180. This enables the application server 180 to switch the XR compute location from the UE 120 to the application server 180. As another example, if the current XR compute location is the application server 180, and the XR device 160 determines that the XR compute location is to be the UE 120, the XR device 160 may transmit the indication of the XR compute location to the application server 180. This enables the application server 180 to switch the XR compute location from the application server 180 to the UE 120.

As another example, if the current XR compute location is the UE 120, and the XR device 160 determines that the XR compute location is to be the UE 120, the XR device 160 may refrain from transmitting the indication of the XR compute location to the application server 180, as the application server 180 does not need to change the XR compute location. This reduces consumption of processing and memory resources of the XR device 160, the UE 120, and/or the network node 110, as well as reduces consumption of wireless radio link resources between the UE 120 and the network node 110. As another example, if the current XR compute location is the application server 180, and the XR device 160 determines that the XR compute location is to be the application server 180, the XR device 160 may refrain from transmitting the indication of the XR compute location to the application server 180.

As indicated above, FIG. 7 is provided as an example. Other examples may differ from what is described with regard to FIG. 7.

Figure 8:
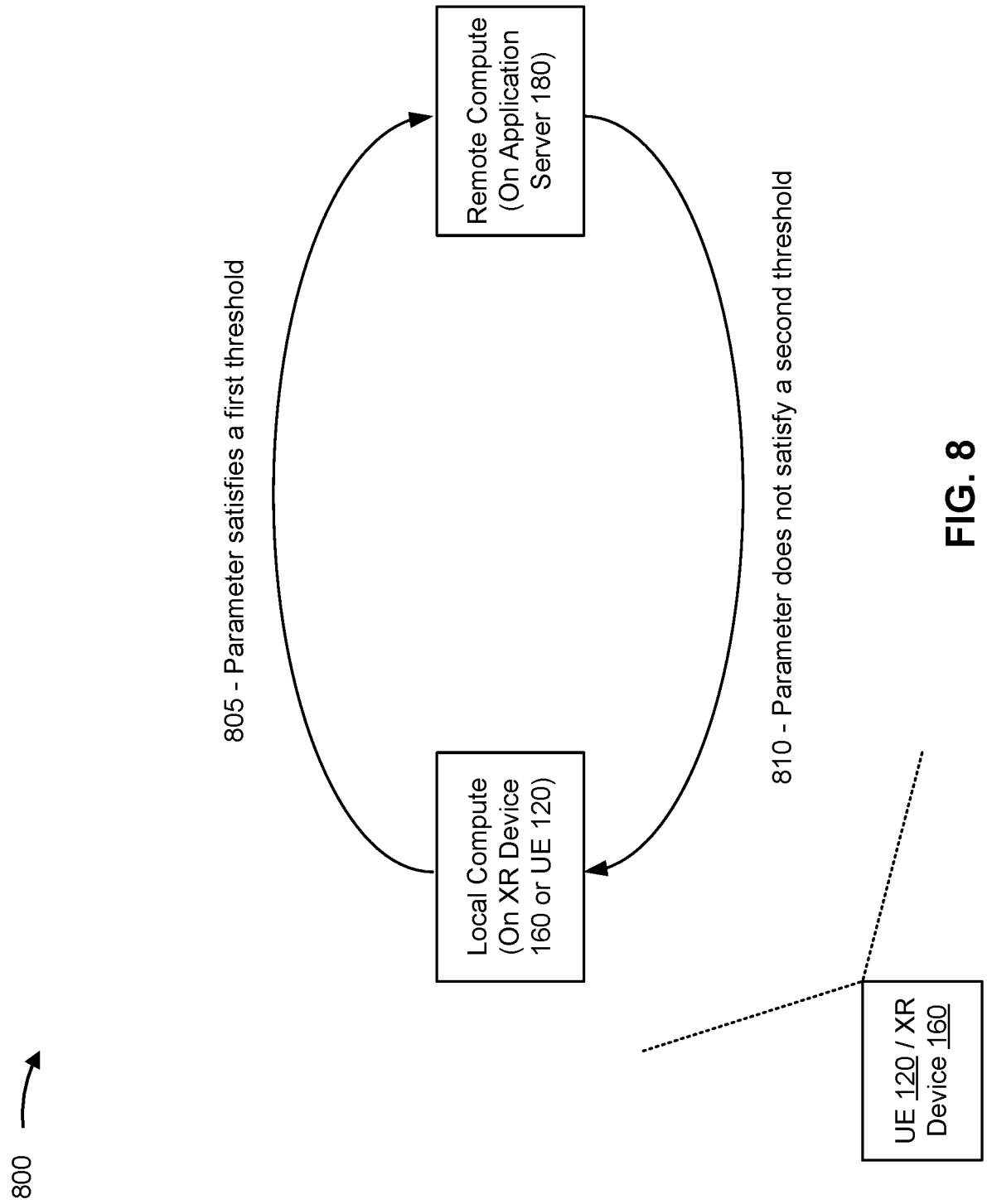
FIG. 8 is a diagram of an example of dynamic distributed XR compute, in accordance with the present disclosure.

FIG. 8 is a diagram of an example 800 of dynamic distributed XR compute, in accordance with the present disclosure. The operations described in connection with the example 800 may be performed by a UE 120 and/or an XR device 160.

As shown in FIG. 8, a decision loop may be implemented to determine whether XR data is to be handled by local compute (e.g., on the XR device 160 or the UE 120) or by remote compute (e.g., on an application server 180). At 805, an XR compute location may be switched from local compute to remote compute based at least in part on a parameter satisfying a first threshold. At 810, an XR compute location may be switched from remote compute to local compute based at least in part on the parameter not satisfying a second threshold. In some aspects, the XR compute location may be maintained if the parameter does not satisfy the first threshold and/or if the parameter does not satisfy the second threshold.

In some aspects, the parameter is an RSRP. Here, the first threshold may include a combination of an RSRP threshold and a first sensitivity parameter, and the second threshold may include a combination of the RSRP threshold and a second sensitivity parameter. Accordingly, the XR compute location may be switched from local compute to remote compute at 805 if $X>T+\delta_1$, where X corresponds to an RSRP measurement, T corresponds to the RSRP threshold, and $\delta_1$ corresponds to the first sensitivity parameter. The XR compute location may be switched from remote compute to local compute at 810 if $X<T+\delta_2$, where X corresponds to an RSRP measurement, T corresponds to the RSRP threshold, and $\delta_2$ corresponds to the second sensitivity parameter. The XR compute location may be maintained if $T+\delta_2<X<T+\delta_1$.

The first sensitivity parameter and the second sensitivity parameter may be selected to provide hysteresis to prevent frequent switching of the XR compute location and to provide robustness to channel variations. To do so, the first sensitivity parameter may be selected to be a value that is greater relative to the value selected for the second sensitivity parameter (e.g., so that $\delta_1>\delta_2>0$).

In some aspects, the parameter is an eLCE. Here, the first threshold may include a combination of a required bitrate for XR data computation (T) and a first sensitivity parameter ($\delta_1$), and the second threshold may include a combination of the required bitrate threshold and a second sensitivity parameter ($\delta_2$).

As indicated above, FIG. 8 is provided as an example. Other examples may differ from what is described with regard to FIG. 8.

Figure 9:
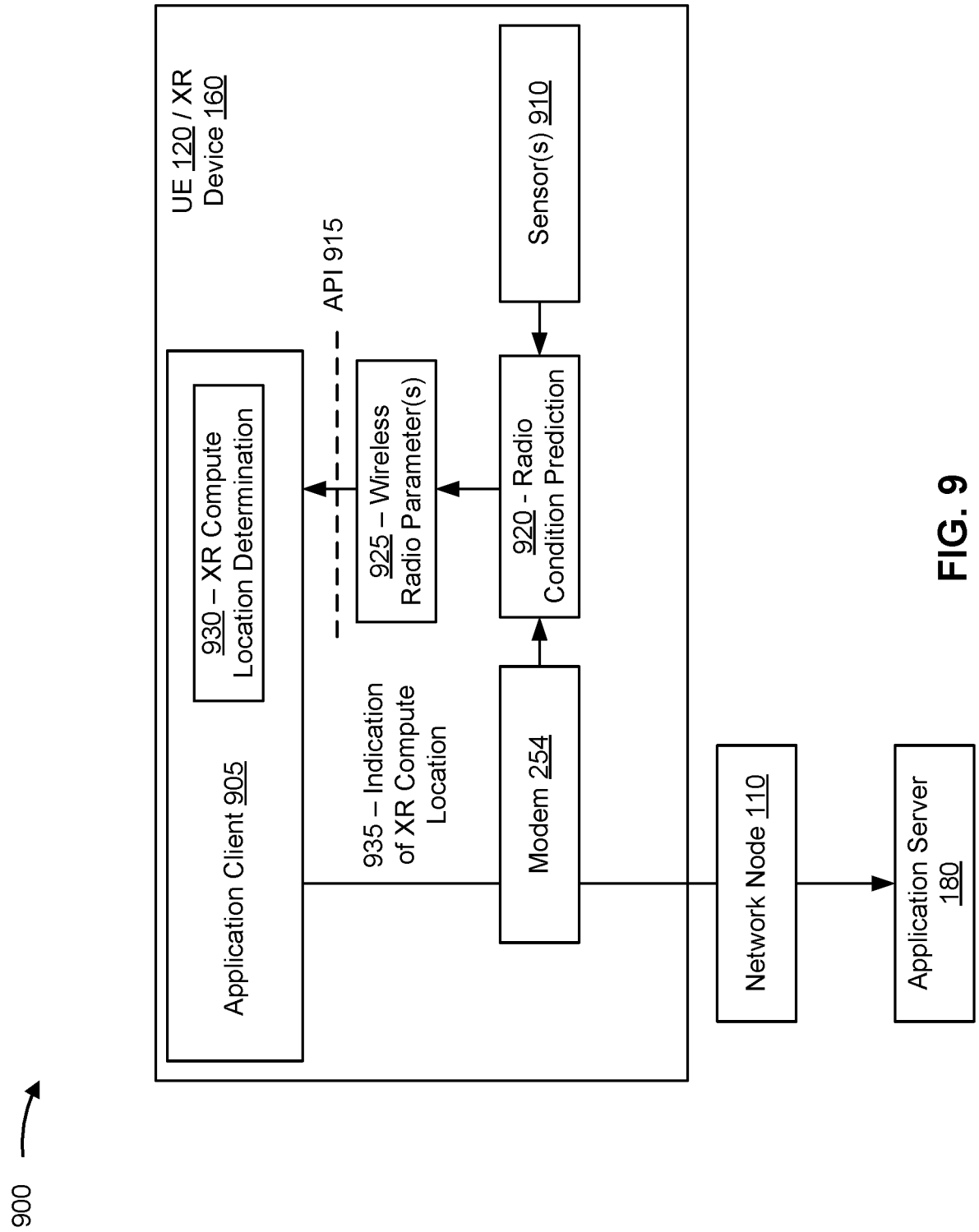
FIG. 9 is a diagram of an example of dynamic distributed XR compute, in accordance with the present disclosure.

FIG. 9 is a diagram of an example 900 of dynamic distributed XR compute, in accordance with the present disclosure. The configuration and/or operations described in connection with the example 800 may be included in and/or performed by a UE 120 and/or an XR device 160.

As shown in FIG. 9, the configuration may include an application client 905 (e.g., an XR-based application client), one or more sensors 910 (e.g., gyroscopes, 6DOF sensors), accelerometers, cameras), and an application programming interface (API) 915 that enables communication between the application client 905 and a modem 254 and the sensor(s) 910. Information provided by the modem 254 (e.g., link information, beam measurements) and perception of the environment of the UE 120 and/or the XR device 160 provided by the sensor(s) 910 may be used to generate a radio condition prediction at 920. The radio condition prediction may include a blockage prediction (e.g., a time and/or a duration of a radio blockage), an RF environment mapping (e.g., a map position to RSRP mapping, a map position to link rate mapping), and/or another type of radio condition prediction. At 925, wireless radio parameter(s) may be determined, such as an RSRP and/or an eLCE, among other examples.

The radio condition prediction and the wireless radio parameter(s) may be provided to the application client 905 via the API 915 such that an XR compute location determination may be performed at 930. At 935, an indication of the XR compute location may be provided from the application client 905 to the modem 254, which may transmit the indication of the XR compute location to a network node 110 for transmission to an application server 180 associated with the application client 905.

As indicated above, FIG. 9 is provided as an example. Other examples may differ from what is described with regard to FIG. 9.

Figure 10:
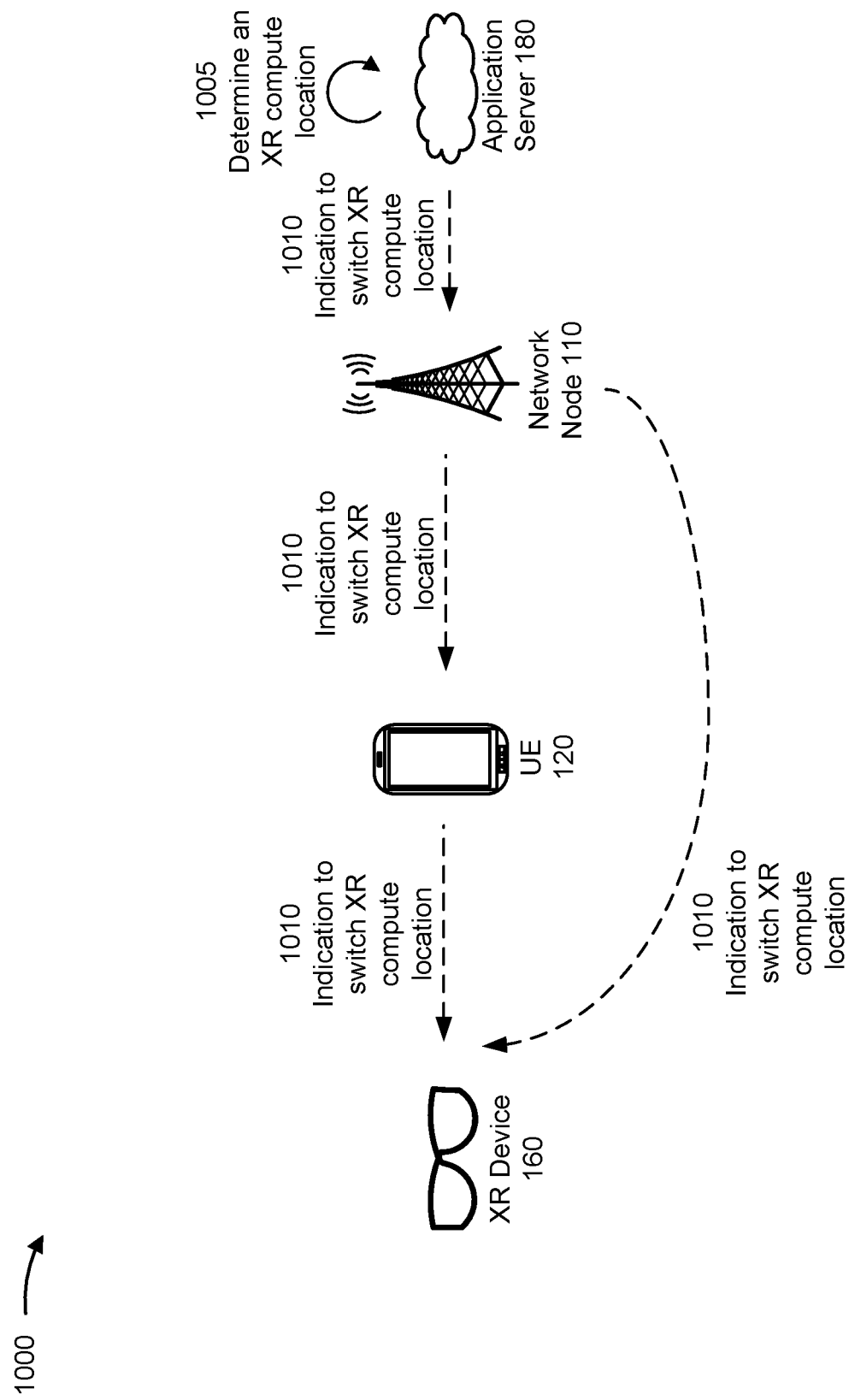
FIG. 10 is a diagram of an example of dynamic distributed XR compute, in accordance with the present disclosure.

FIG. 10 is a diagram of an example 1000 of dynamic distributed XR compute, in accordance with the present disclosure. As shown in FIG. 10, the example 1000 of dynamic distributed XR compute may include an XR device 160, a UE 120, a network node 110, and/or an application server 180, among other examples.

At 1005, the application server 180 may determine an XR compute location for XR data associated with the XR device 160. At 1010, the application server 180 may selectively transmit an indication to switch the XR compute location to the UE 120 through the network node 110. Moreover, the application server 180 may selectively transmit an indication to switch the XR compute location to the XR device 160 (either through the UE 120 and the network node 110, or through the network node 110 without relaying the indication through the UE 120). The application server 180 may selectively switch the XR compute location based at least in part on the determination.

The application server 180 may determine the XR compute location based at least in part on one or more parameters. The one or more parameters may include one or more downlink parameters associated with a downlink between the network node 110 and the UE 120 (or between the network node 110 and the XR device 160). The one or more downlink parameters may include a downlink RSRP, a downlink RSSI, a downlink RSRQ, a downlink CQI, a downlink throughput, and/or another downlink parameter.

For example, if the application server 180 determines that a downlink parameter does not satisfy a threshold (e.g., the downlink RSRP is less than an RSRP threshold, is equal to the RSRP threshold), the application server 180 may determine the XR compute location to be the UE 120 (or the XR device 160) to enable local compute to be performed due to degraded radio conditions on the downlink.

As another example, if the application server 180 determines that a downlink parameter does satisfies a threshold (e.g., the downlink throughput is greater than a throughput threshold, is equal to the throughput threshold), the application server 180 may determine the XR compute location to be the application server 180 to enable remote compute to be performed to conserve processing and memory resources of the UE 120 and/or of the XR device 160.

As indicated above, FIG. 10 is provided as an example. Other examples may differ from what is described with regard to FIG. 10.

Figure 11:
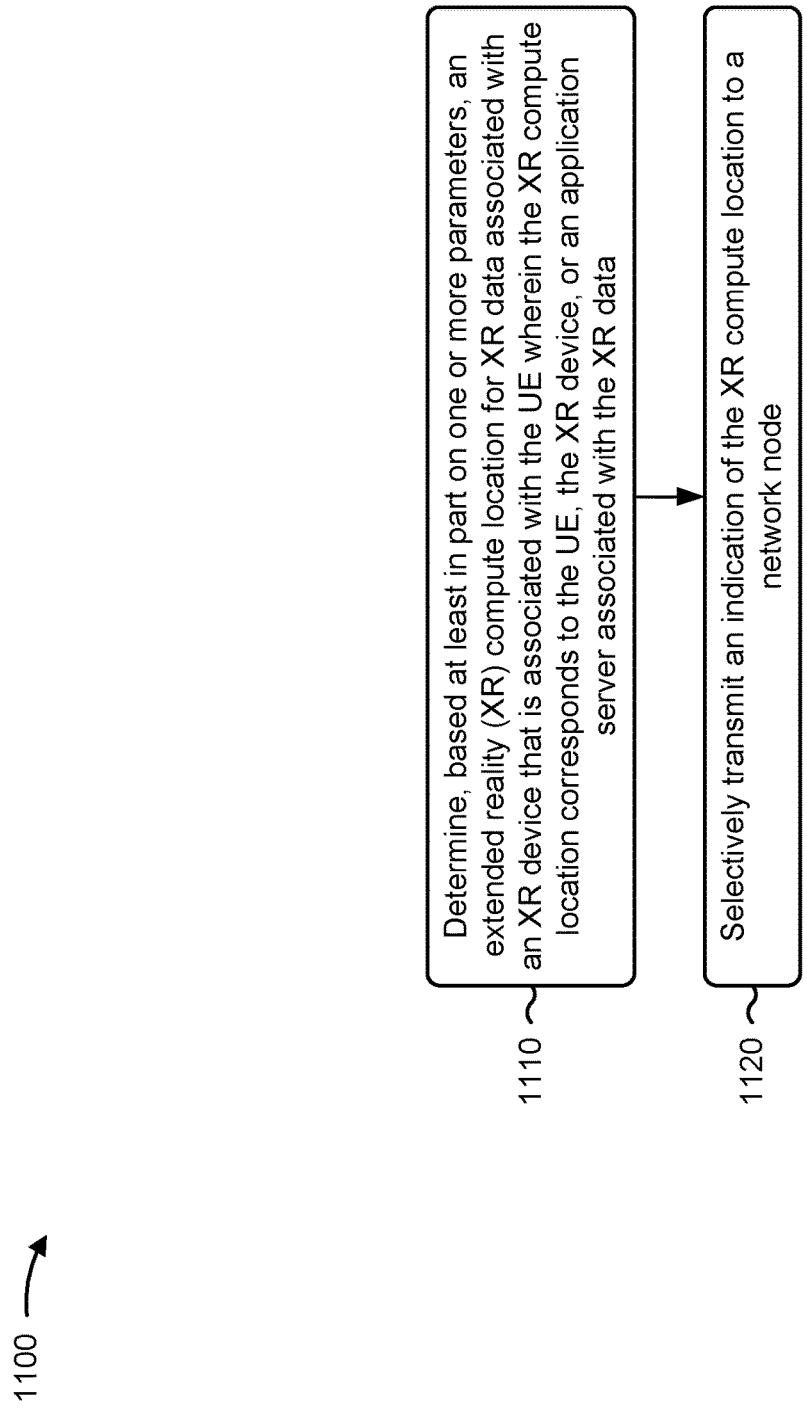
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with dynamic distributed XR compute.

As shown in FIG. 11, in some aspects, process 1100 may include determining, based at least in part on one or more parameters, an XR compute location for XR data associated with an XR device that is associated with the UE, wherein the XR compute location corresponds to the UE, the XR device, or an application server associated with the XR data (block 1110). For example, the UE (e.g., using communication manager 140 and/or determination component 1408, depicted in FIG. 14) may determine, based at least in part on one or more parameters, an XR compute location for XR data associated with an XR device that is associated with the UE, as described above. In some aspects, the XR compute location corresponds to the UE, the XR device, or an application server associated with the XR data.

As further shown in FIG. 11, in some aspects, process 1100 may include selectively transmitting an indication of the XR compute location to a network node (block 1120). For example, the UE (e.g., using communication manager 140 and/or transmission component 1404, depicted in FIG. 14) may selectively transmit an indication of the XR compute location to a network node, as described above.

Process 1100 may include additional aspects, such as any single aspect or any combination of aspects described below and/or in connection with one or more other processes described elsewhere herein.

In a first aspect, the one or more parameters comprise at least one of one or more wireless radio parameters, one or more power consumption parameters, or one or more wireless radio condition predictions.

In a second aspect, alone or in combination with the first aspect, each of the one or more wireless radio parameters, each of the one or more power consumption parameters, or each of the one or more wireless radio condition predictions are assigned respective weights.

In a third aspect, alone or in combination with one or more of the first and second aspects, the one or more parameters further comprise at least one of a packet loss rate associated with the UE, an RTT associated with the UE, an estimated network load associated with the network node, or an estimated load associated with the application server that is associated with the XR data.

In a fourth aspect, alone or in combination with one or more of the first through third aspects, the one or more parameters comprise one or more wireless radio parameters, and the one or more wireless radio parameters comprise at least one of an RSRP, or an eLCE.

In a fifth aspect, alone or in combination with one or more of the first through fourth aspects, the one or more parameters comprise a wireless radio parameter, and determining the XR compute location comprises determining the XR compute location based at least in part on whether the wireless radio parameter satisfies a threshold.

In a sixth aspect, alone or in combination with one or more of the first through fifth aspects, the threshold comprises a combination of a threshold parameter and a sensitivity parameter.

In a seventh aspect, alone or in combination with one or more of the first through sixth aspects, determining the XR compute location comprises determining that the wireless radio parameter satisfies the threshold, and determining, based at least in part on determining that the wireless radio parameter satisfies the threshold, the XR compute location to be the application server associated with the XR data.

In an eighth aspect, alone or in combination with one or more of the first through seventh aspects, the threshold comprises a first threshold, and determining the XR compute location comprises determining that the wireless radio parameter does not satisfy a second threshold, and determining, based at least in part on determining that the wireless radio parameter does not satisfy the second threshold, the XR compute location to be the UE.

In a ninth aspect, alone or in combination with one or more of the first through eighth aspects, the first threshold comprises a combination of a threshold parameter and a first sensitivity parameter, wherein the second threshold comprises a combination of the threshold parameter and a second sensitivity parameter, and wherein the first sensitivity parameter is greater relative to the second sensitivity parameter.

In a tenth aspect, alone or in combination with one or more of the first through ninth aspects, the threshold comprises a first threshold, and determining the XR compute location comprises determining that the wireless radio parameter does not satisfy the first threshold, determining that the wireless radio parameter satisfies a second threshold, and determining to maintain the XR compute location for the XR data based at least in part on determining that the wireless radio parameter does not satisfy the first threshold and that the wireless radio parameter satisfies the second threshold.

In an eleventh aspect, alone or in combination with one or more of the first through tenth aspects, the one or more parameters comprise one or more wireless radio condition predictions, and the one or more wireless radio condition predictions comprise at least one of a wireless radio blockage prediction associated with the UE, or a RF environment mapping of an area in which the UE is located.

In a twelfth aspect, alone or in combination with one or more of the first through eleventh aspects, the one or more parameters comprise a plurality of power consumption parameters, and the plurality of power consumption parameters comprise a first estimated power consumption of the UE if the XR compute location were the UE, and a second estimated power consumption of the UE if the XR compute location were the application server associated with the XR data.

In a thirteenth aspect, alone or in combination with one or more of the first through twelfth aspects, the first estimated power consumption and the second estimated power consumption each include a combination of an estimated wireless radio power consumption of the UE and an estimated XR compute power consumption of the UE.

In a fourteenth aspect, alone or in combination with one or more of the first through thirteenth aspects, determining the XR compute location comprises determining that the second estimated power consumption is greater relative to the first estimated power consumption, and determining the XR compute location to be the UE based at least in part on determining that the second estimated power consumption is greater relative to the first estimated power consumption.

In a fifteenth aspect, alone or in combination with one or more of the first through fourteenth aspects, determining the XR compute location comprises determining that the first estimated power consumption is greater relative to the second estimated power consumption, and determining the XR compute location to be the application server based at least in part on determining that the first estimated power consumption is greater relative to the second estimated power consumption.

In a sixteenth aspect, alone or in combination with one or more of the first through fifteenth aspects, selectively transmitting the indication of the XR compute location to the network node comprises refraining from transmitting the indication of the XR compute location based at least in part on determining to maintain the XR compute location.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
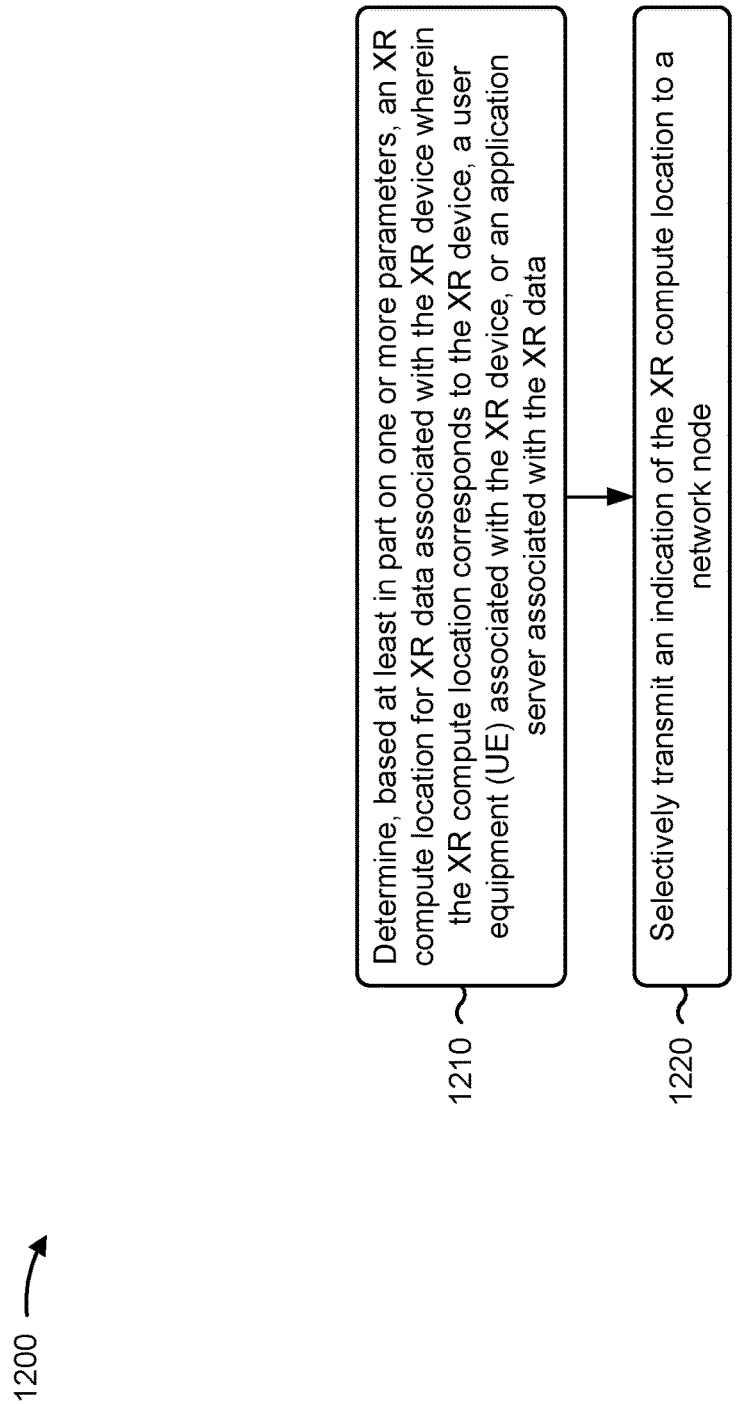
FIG. 12 is a diagram illustrating an example process performed, for example, by an XR device, in accordance with the present disclosure.

FIG. 12 is a diagram illustrating an example process 1200 performed, for example, by an XR device, in accordance with the present disclosure. Example process 1200 is an example where the XR device (e.g., XR device 160) performs operations associated with dynamic distributed XR compute.

As shown in FIG. 12, in some aspects, process 1200 may include determining, based at least in part on one or more parameters, an XR compute location for XR data associated with the XR device, wherein the XR compute location corresponds to the XR device, a UE associated with the XR device, or an application server associated with the XR data (block 1210). For example, the XR device (e.g., using communication manager 170 and/or determination component 1508, depicted in FIG. 15) may determine, based at least in part on one or more parameters, an XR compute location for XR data associated with the XR device, as described above. In some aspects, the XR compute location corresponds to the XR device, a UE associated with the XR device, or an application server associated with the XR data.

As further shown in FIG. 12, in some aspects, process 1200 may include selectively transmitting an indication of the XR compute location to a network node (block 1220). For example, the XR device (e.g., using communication manager 170 and/or transmission component 1504, depicted in FIG. 15) may selectively transmit an indication of the XR compute location to a network node, as described above.

Process 1200 may include additional aspects, such as any single aspect or any combination of aspects described below and/or in connection with one or more other processes described elsewhere herein.

In a first aspect, the one or more parameters comprise at least one of one or more wireless radio parameters, one or more power consumption parameters, or one or more wireless radio condition predictions.

In a second aspect, alone or in combination with the first aspect, each of the one or more wireless radio parameters, each of the one or more power consumption parameters, and each of the one or more wireless radio condition predictions are assigned respective weights.

In a third aspect, alone or in combination with one or more of the first and second aspects, the one or more parameters further comprise at least one of a packet loss rate, an RTT, an estimated network load associated with the network node, or an estimated load associated with the application server that is associated with the XR data.

In a fourth aspect, alone or in combination with one or more of the first through third aspects, the one or more parameters comprise one or more wireless radio parameters, and the one or more wireless radio parameters comprise at least one of an RSRP, or an eLCE.

In a fifth aspect, alone or in combination with one or more of the first through fourth aspects, the one or more parameters comprise a wireless radio parameter, and determining the XR compute location comprises determining the XR compute location based at least in part on whether the wireless radio parameter satisfies a threshold.

In a sixth aspect, alone or in combination with one or more of the first through fifth aspects, the threshold comprises a combination of a threshold parameter and a sensitivity parameter.

In a seventh aspect, alone or in combination with one or more of the first through sixth aspects, determining the XR compute location comprises determining that the wireless radio parameter satisfies the threshold, and determining the XR compute location to be the network node based at least in part on determining that the wireless radio parameter satisfies the threshold.

In an eighth aspect, alone or in combination with one or more of the first through seventh aspects, the threshold comprises a first threshold, and determining the XR compute location comprises determining that the wireless radio parameter does not satisfy a second threshold, and determining, based at least in part on determining that the wireless radio parameter does not satisfy the second threshold, the XR compute location to be the XR device.

In a ninth aspect, alone or in combination with one or more of the first through eighth aspects, the threshold comprises a first threshold, and determining the XR compute location comprises determining that the wireless radio parameter does not satisfy a second threshold, and determining, based at least in part on determining that the wireless radio parameter does not satisfy the second threshold, the XR compute location to be the UE associated with the XR device.

In a tenth aspect, alone or in combination with one or more of the first through ninth aspects, the first threshold comprises a combination of a threshold parameter and a first sensitivity parameter, wherein the second threshold comprises a combination of the threshold parameter and a second sensitivity parameter, and wherein the first sensitivity parameter is greater relative to the second sensitivity parameter.

In an eleventh aspect, alone or in combination with one or more of the first through tenth aspects, the threshold comprises a first threshold, and determining the XR compute location comprises determining that the wireless radio parameter does not satisfy the first threshold, determining that the wireless radio parameter satisfies a second threshold, and determining to maintain the XR compute location for the XR data based at least in part one determining that the wireless radio parameter does not satisfy the first threshold and that the wireless radio parameter satisfies the second threshold.

In a twelfth aspect, alone or in combination with one or more of the first through eleventh aspects, the one or more parameters comprise one or more wireless radio condition predictions, and the one or more wireless radio condition predictions comprise at least one of a wireless radio blockage prediction associated with the XR device, or a radio frequency (RF) environment mapping of an area in which the XR device is located.

In a thirteenth aspect, alone or in combination with one or more of the first through twelfth aspects, the one or more parameters comprise one or more wireless radio condition predictions, and the one or more wireless radio condition predictions comprise at least one of a wireless radio blockage prediction associated with the UE associated with the XR device, or an RF environment mapping of an area in which the UE is located.

In a fourteenth aspect, alone or in combination with one or more of the first through thirteenth aspects, the one or more parameters comprise a plurality of power consumption parameters, and the plurality of power consumption parameters comprise a first estimated power consumption of the XR device if the XR compute location were the XR device, and a second estimated power consumption of the XR device if the XR compute location were the application server associated with the XR data.

In a fifteenth aspect, alone or in combination with one or more of the first through fourteenth aspects, the first estimated power consumption and the second estimated power consumption each include a combination of an estimated wireless radio power consumption of the XR device and an estimated XR compute power consumption of the XR device.

In a sixteenth aspect, alone or in combination with one or more of the first through fifteenth aspects, determining the XR compute location comprises determining that the second estimated power consumption is greater relative to the first estimated power consumption, and determining the XR compute location to be the XR device based at least in part on determining that the second estimated power consumption is greater relative to the first estimated power consumption.

In a seventeenth aspect, alone or in combination with one or more of the first through sixteenth aspects, determining the XR compute location comprises determining that the first estimated power consumption is greater relative to the second estimated power consumption, and determining the XR compute location to be the application server based at least in part on determining that the first estimated power consumption is greater relative to the second estimated power consumption.

In an eighteenth aspect, alone or in combination with one or more of the first through seventeenth aspects, the one or more parameters comprise a plurality of power consumption parameters, and the plurality of power consumption parameters comprise a first estimated power consumption of the UE, associated with the XR device, if the XR compute location were the UE, and a second estimated power consumption of the UE if the XR compute location were the application server associated with the XR data.

In a nineteenth aspect, alone or in combination with one or more of the first through eighteenth aspects, the first estimated power consumption and the second estimated power consumption each include a combination of an estimated wireless radio power consumption of the UE and an estimated XR compute power consumption of the UE.

In a twentieth aspect, alone or in combination with one or more of the first through nineteenth aspects, determining the XR compute location comprises determining that the second estimated power consumption is greater relative to the first estimated power consumption, and determining the XR compute location to be the UE based at least in part on determining that the second estimated power consumption is greater relative to the first estimated power consumption.

In a twenty-first aspect, alone or in combination with one or more of the first through twentieth aspects, determining the XR compute location comprises determining that the first estimated power consumption is greater relative to the second estimated power consumption, and determining the XR compute location to be the application server based at least in part on determining that the first estimated power consumption is greater relative to the second estimated power consumption.

In a twenty-second aspect, alone or in combination with one or more of the first through twenty-first aspects, selectively transmitting the indication of the XR compute location to the network node comprises transmitting the indication of the XR compute location to the UE for transmission to the network node.

In a twenty-third aspect, alone or in combination with one or more of the first through twenty-second aspects, selectively transmitting the indication of the XR compute location to the network node comprises transmitting the indication of the XR compute location directly to the network node on a wireless radio link between the XR device and the network node.

In a twenty-fourth aspect, alone or in combination with one or more of the first through twenty-third aspects, selectively transmitting the indication of the XR compute location to the network node comprises refraining from transmitting the indication of the XR compute location based at least in part on determining to maintain the XR compute location.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
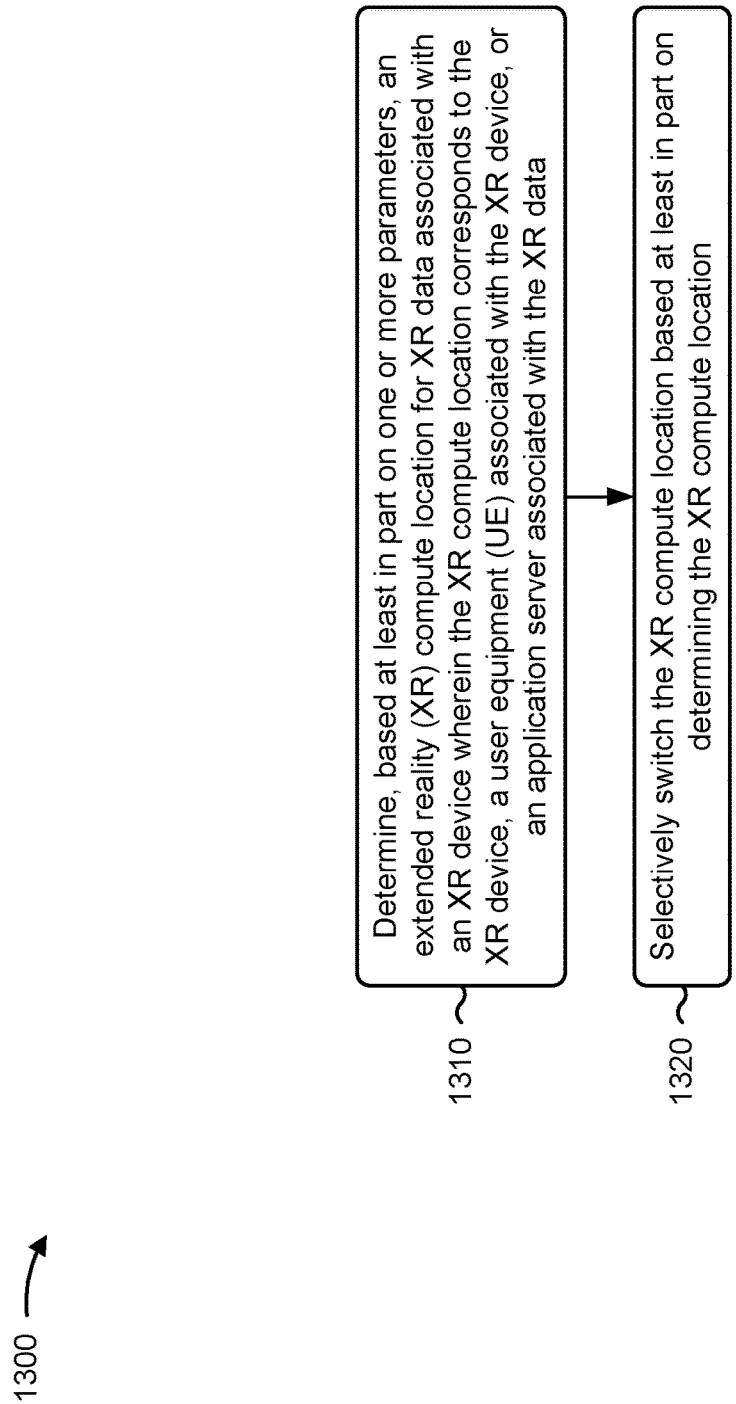
FIG. 13 is a diagram illustrating an example process performed, for example, by an application server, in accordance with the present disclosure.

FIG. 13 is a diagram illustrating an example process 1300 performed, for example, by an application server, in accordance with the present disclosure. Example process 1300 is an example where the application server (e.g., application server 180) performs operations associated with dynamic distributed XR compute.

As shown in FIG. 13, in some aspects, process 1300 may include determining, based at least in part on one or more parameters, an XR compute location for XR data associated with an XR device, wherein the XR compute location corresponds to the XR device, a UE associated with the XR device, or an application server associated with the XR data (block 1310). For example, the application server (e.g., using communication manager 190 and/or determination component 1608, depicted in FIG. 16) may determine, based at least in part on one or more parameters, an XR compute location for XR data associated with an XR device, wherein the XR compute location corresponds to the XR device, a UE associated with the XR device, or an application server associated with the XR data, as described above. In some aspects, the XR compute location corresponds to the XR device, a UE associated with the XR device, or an application server associated with the XR data.

As further shown in FIG. 13, in some aspects, process 1300 may include selectively switching the XR compute location based at least in part on determining the XR compute location (block 1320). For example, the application server (e.g., using communication manager 190 and/or switching component 1610, depicted in FIG. 16) may selectively switch the XR compute location based at least in part on determining the XR compute location, as described above.

Process 1300 may include additional aspects, such as any single aspect or any combination of aspects described below and/or in connection with one or more other processes described elsewhere herein.

In a first aspect, the one or more parameters comprise one or more downlink parameters associated with a downlink between a network node at the XR device.

In a second aspect, alone or in combination with the first aspect, the one or more downlink parameters comprise at least one of a downlink RSRP, or a downlink throughput.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
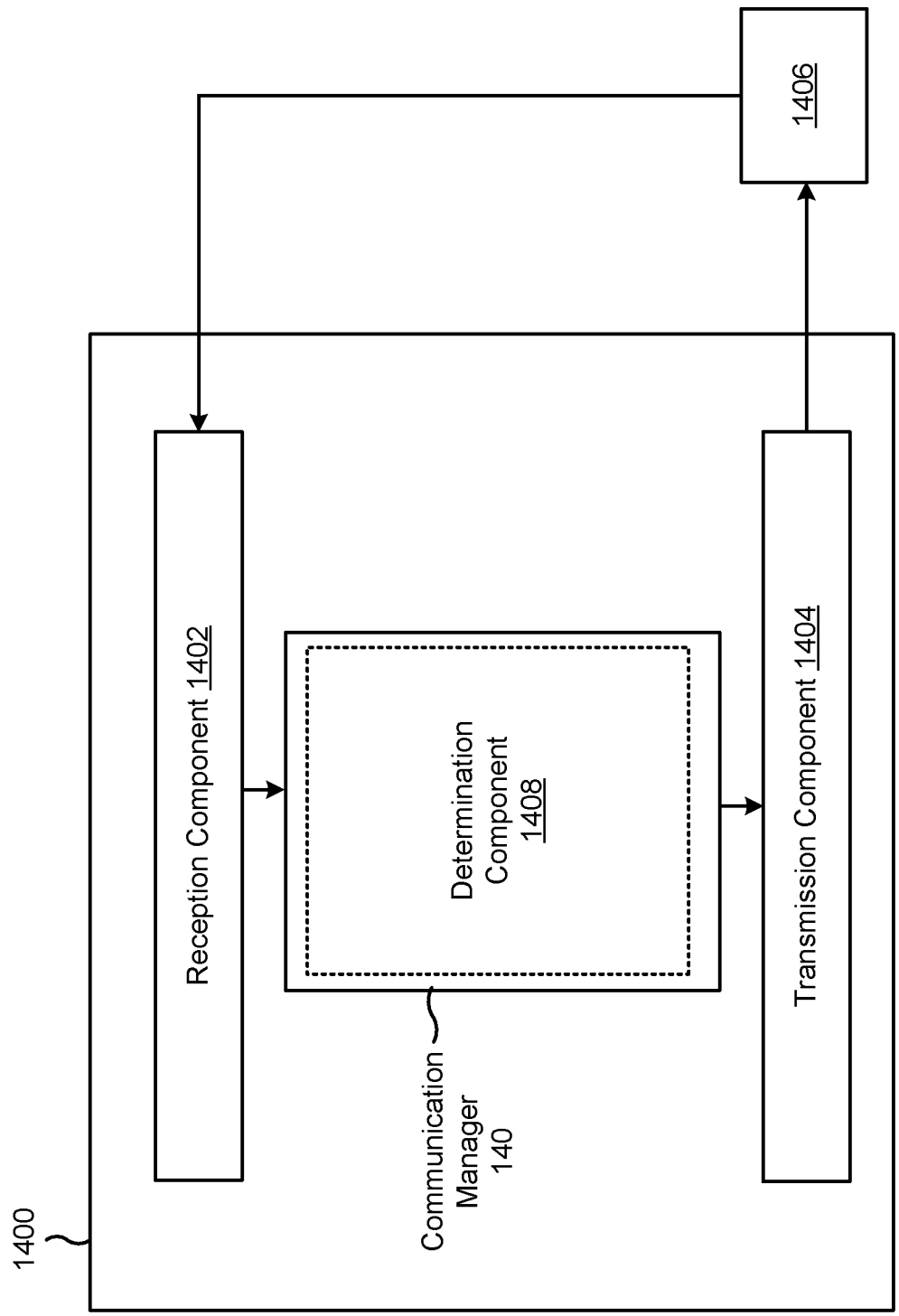
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE 120, or a UE 120 may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as another UE 120, an XR device 160, an application server 180, a network node 110, and/or another wireless communication device) using the reception component 1402 and the transmission component 1404. As further shown, the apparatus 1400 may include the communication manager 140. The communication manager 140 may include a determination component 1408, among other examples.

In some aspects, the apparatus 1400 may be configured to perform one or more operations described herein in connection with FIGS. 5A-10. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the UE 120 described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE 120 described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE 120 described in connection with FIG. 2. In some aspects, the transmission component 1404 may be co-located with the reception component 1402 in a transceiver.

The determination component 1408 may determine, based at least in part on one or more parameters, an XR compute location for XR data associated with an XR device that is associated with the apparatus 1400. The XR compute location corresponds to the apparatus 1400, the XR device, or an application server associated with the XR data. The transmission component 1404 may selectively transmit an indication of the XR compute location to the apparatus 1406.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
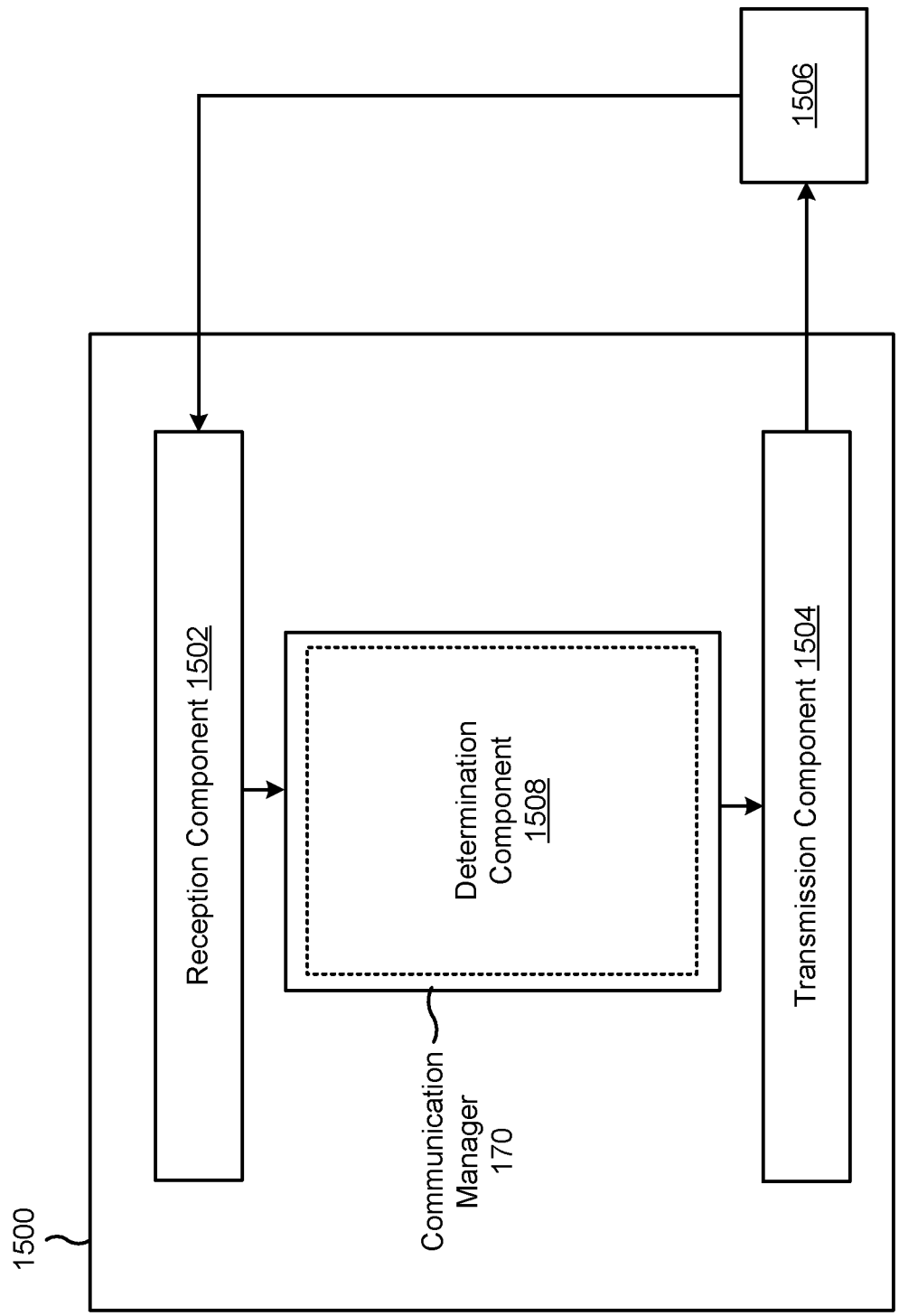
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a XR device 160, or a XR device 160 may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE 120, a network node 110, an application server 180, and/or or another wireless communication device) using the reception component 1502 and the transmission component 1504. As further shown, the apparatus 1500 may include the communication manager 170. The communication manager 170 may include a determination component 1508, among other examples.

In some aspects, the apparatus 1500 may be configured to perform one or more operations described herein in connection with FIGS. 5A-10. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the XR device 160 described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include a controller/processor, a memory, a communication unit, or a combination thereof, of the XR device 160 described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include a controller/processor, a memory, a communication unit, or a combination thereof, of the XR device 160 described in connection with FIG. 2. In some aspects, the transmission component 1504 may be co-located with the reception component 1502 in a transceiver.

The determination component 1508 may determine, based at least in part on one or more parameters, an XR compute location for XR data associated with the apparatus 1500. The XR compute location corresponds to the apparatus 1500, a UE associated with the apparatus 1500, or an application server associated with the XR data. The transmission component 1504 may selectively transmit an indication of the XR compute location to the apparatus 1506.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
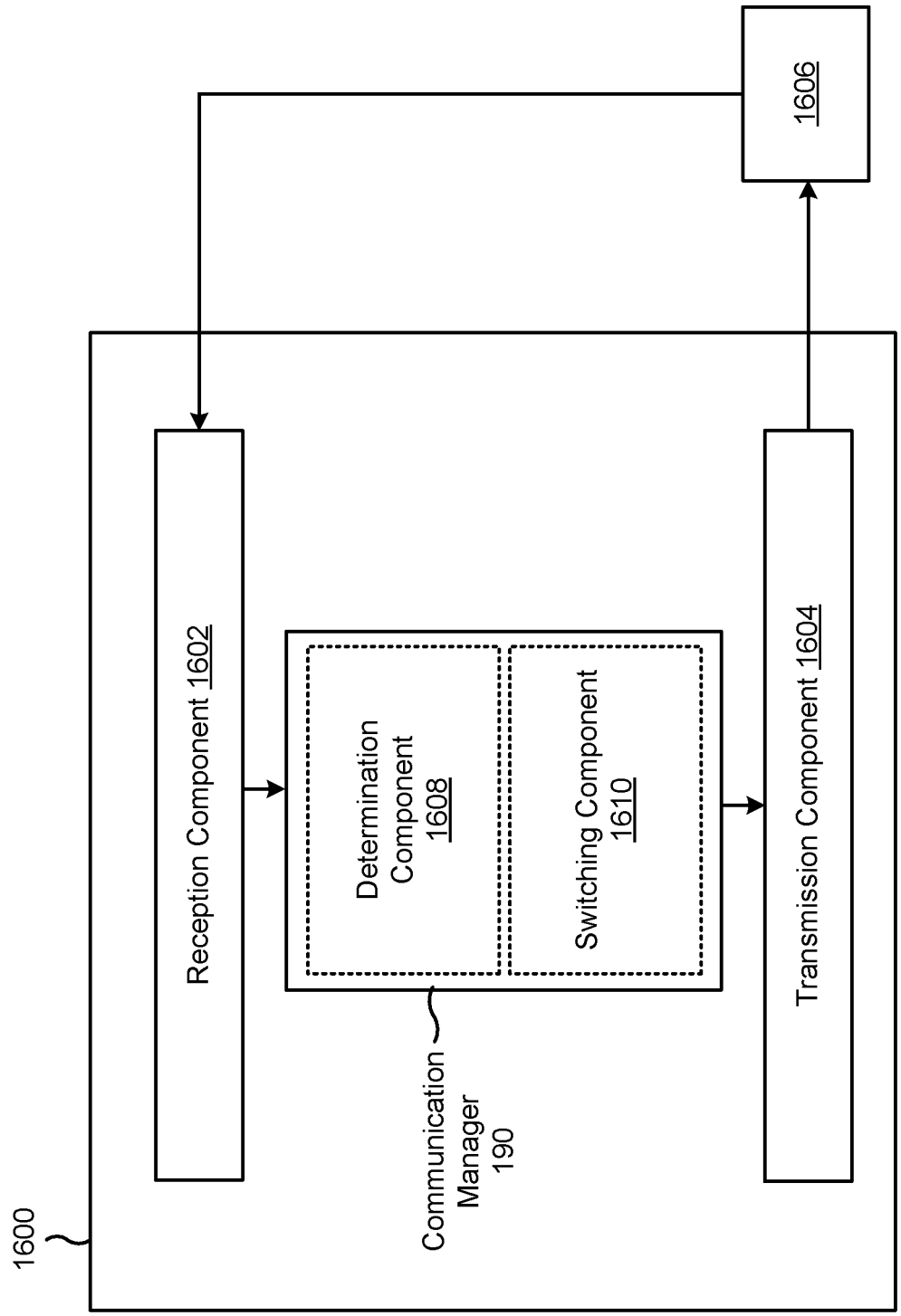
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be an application server 180, or an application server 180 may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE 120, a network node 110, an XR device 160, and/or or another wireless communication device) using the reception component 1602 and the transmission component 1604. As further shown, the apparatus 1600 may include the communication manager 190. The communication manager 190 may include one or more of a determination component 1608 and/or a switching component 1610, among other examples.

In some aspects, the apparatus 1600 may be configured to perform one or more operations described herein in connection with FIGS. 5A-10. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the application server 180 described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include a controller/processor, a memory, a communication unit, or a combination thereof, of the application server 180 described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include a controller/processor, a memory, a communication unit, or a combination thereof, of the application server 180 described in connection with FIG. 2. In some aspects, the transmission component 1604 may be co-located with the reception component 1602 in a transceiver.

The determination component 1608 may determine, based at least in part on one or more parameters, an XR compute location for XR data associated with an XR device, wherein the XR compute location corresponds to the XR device, a UE associated with the XR device, or an application server associated with the XR data. The switching component 1610 may selectively switch the XR compute location based at least in part on the determination component 1608 determining the XR compute location.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: determining, based at least in part on one or more parameters, an extended reality (XR) compute location for XR data associated with an XR device that is associated with the UE, wherein the XR compute location corresponds to the UE, the XR device, or an application server associated with the XR data; and selectively transmitting an indication of the XR compute location to a network node.

Aspect 2: The method of Aspect 1, wherein the one or more parameters comprise at least one of: one or more wireless radio parameters, one or more power consumption parameters, or one or more wireless radio condition predictions. one or more wireless radio parameters, one or more power consumption parameters, or one or more wireless radio condition predictions.

Aspect 3: The method of Aspect 2, wherein each of the one or more wireless radio parameters, each of the one or more power consumption parameters, or each of the one or more wireless radio condition predictions are assigned respective weights.

Aspect 4: The method of Aspect 2, wherein the one or more parameters further comprise at least one of: a packet loss rate associated with the UE, a round trip time (RTT) associated with the UE, an estimated network load associated with the network node, or an estimated load associated with the application server that is associated with the XR data. a packet loss rate associated with the UE, a round trip time (RTT) associated with the UE, an estimated network load associated with the network node, or an estimated load associated with the application server that is associated with the XR data.

Aspect 5: The method of any of Aspects 1-4, wherein the one or more parameters comprise one or more wireless radio parameters; and wherein the one or more wireless radio parameters comprise at least one of: a reference signal received power (RSRP), or an enhanced link capacity estimate (eLCE).

Aspect 6: The method of any of Aspects 1-5, wherein the one or more parameters comprise a wireless radio parameter; and wherein determining the XR compute location comprises: determining the XR compute location based at least in part on whether the wireless radio parameter satisfies a threshold, wherein determining the XR compute location comprises: determining the XR compute location based at least in part on whether the wireless radio parameter satisfies a threshold.

Aspect 7: The method of Aspect 6, wherein the threshold comprises a combination of a threshold parameter and a sensitivity parameter.

Aspect 8: The method of Aspect 6, wherein determining the XR compute location comprises: determining that the wireless radio parameter satisfies the threshold; and determining, based at least in part on determining that the wireless radio parameter satisfies the threshold, the XR compute location to be the application server associated with the XR data. determining that the wireless radio parameter satisfies the threshold; and determining, based at least in part on determining that the wireless radio parameter satisfies the threshold, the XR compute location to be the application server associated with the XR data.

Aspect 9: The method of Aspect 6, wherein the threshold comprises a first threshold; and wherein determining the XR compute location comprises: determining that the wireless radio parameter does not satisfy a second threshold; and determining, based at least in part on determining that the wireless radio parameter does not satisfy the second threshold, the XR compute location to be the UE, wherein determining the XR compute location comprises: determining that the wireless radio parameter does not satisfy a second threshold; and determining, based at least in part on determining that the wireless radio parameter does not satisfy the second threshold, the XR compute location to be the UE.

Aspect 10: The method of Aspect 9, wherein the first threshold comprises a combination of a threshold parameter and a first sensitivity parameter; wherein the second threshold comprises a combination of the threshold parameter and a second sensitivity parameter; and wherein the first sensitivity parameter is greater relative to the second sensitivity parameter, wherein the second threshold comprises a combination of the threshold parameter and a second sensitivity parameter; and wherein the first sensitivity parameter is greater relative to the second sensitivity parameter.

Aspect 11: The method of Aspect 6, wherein the threshold comprises a first threshold; and wherein determining the XR compute location comprises: determining that the wireless radio parameter does not satisfy the first threshold; determining that the wireless radio parameter satisfies a second threshold; and determining to maintain the XR compute location for the XR data based at least in part on determining that the wireless radio parameter does not satisfy the first threshold and that the wireless radio parameter satisfies the second threshold, wherein determining the XR compute location comprises: determining that the wireless radio parameter does not satisfy the first threshold; determining that the wireless radio parameter satisfies a second threshold; and determining to maintain the XR compute location for the XR data based at least in part on determining that the wireless radio parameter does not satisfy the first threshold and that the wireless radio parameter satisfies the second threshold.

Aspect 12: The method of any of Aspects 1-11, wherein the one or more parameters comprise one or more wireless radio condition predictions; and wherein the one or more wireless radio condition predictions comprise at least one of: a wireless radio blockage prediction associated with the UE, or a radio frequency (RF) environment mapping of an area in which the UE is located, wherein the one or more wireless radio condition predictions comprise at least one of: a wireless radio blockage prediction associated with the UE, or a radio frequency (RF) environment mapping of an area in which the UE is located.

Aspect 13: The method of any of Aspects 1-12, wherein the one or more parameters comprise a plurality of power consumption parameters; and wherein the plurality of power consumption parameters comprise: a first estimated power consumption of the UE if the XR compute location were the UE, and a second estimated power consumption of the UE if the XR compute location were the application server associated with the XR data, wherein the plurality of power consumption parameters comprise: a first estimated power consumption of the UE if the XR compute location were the UE, and a second estimated power consumption of the UE if the XR compute location were the application server associated with the XR data.

Aspect 14: The method of Aspect 13, wherein the first estimated power consumption and the second estimated power consumption each include a combination of an estimated wireless radio power consumption of the UE and an estimated XR compute power consumption of the UE.

Aspect 15: The method of Aspect 13, wherein determining the XR compute location comprises: determining that the second estimated power consumption is greater relative to the first estimated power consumption; and determining the XR compute location to be the UE based at least in part on determining that the second estimated power consumption is greater relative to the first estimated power consumption. determining that the second estimated power consumption is greater relative to the first estimated power consumption; and determining the XR compute location to be the UE based at least in part on determining that the second estimated power consumption is greater relative to the first estimated power consumption.

Aspect 16: The method of Aspect 13, wherein determining the XR compute location comprises: determining that the first estimated power consumption is greater relative to the second estimated power consumption; and determining the XR compute location to be the application server based at least in part on determining that the first estimated power consumption is greater relative to the second estimated power consumption. determining that the first estimated power consumption is greater relative to the second estimated power consumption; and determining the XR compute location to be the application server based at least in part on determining that the first estimated power consumption is greater relative to the second estimated power consumption.

Aspect 17: The method of any of Aspects 1-16, wherein selectively transmitting the indication of the XR compute location to the network node comprises: refraining from transmitting the indication of the XR compute location based at least in part on determining to maintain the XR compute location. refraining from transmitting the indication of the XR compute location based at least in part on determining to maintain the XR compute location.

Aspect 18: A method of wireless communication performed by an extended reality (XR) device, comprising: determining, based at least in part on one or more parameters, an XR compute location for XR data associated with the XR device, wherein the XR compute location corresponds to the XR device, a user equipment (UE) associated with the XR device, or an application server associated with the XR data; and selectively transmitting an indication of the XR compute location to a network node.

Aspect 19: The method of Aspect 18, wherein the one or more parameters comprise at least one of: one or more wireless radio parameters, one or more power consumption parameters, or one or more wireless radio condition predictions. one or more wireless radio parameters, one or more power consumption parameters, or one or more wireless radio condition predictions.

Aspect 20: The method of Aspect 19, wherein each of the one or more wireless radio parameters, each of the one or more power consumption parameters, and each of the one or more wireless radio condition predictions are assigned respective weights.

Aspect 21: The method of Aspect 19, wherein the one or more parameters further comprise at least one of: a packet loss rate, a round trip time (RTT), an estimated network load associated with the network node, or an estimated load associated with the application server that is associated with the XR data. a packet loss rate, a round trip time (RTT), an estimated network load associated with the network node, or an estimated load associated with the application server that is associated with the XR data.

Aspect 22: The method of any of Aspects 18-21, wherein the one or more parameters comprise one or more wireless radio parameters; and wherein the one or more wireless radio parameters comprise at least one of: a reference signal received power (RSRP), or an enhanced link capacity estimate (eLCE).

Aspect 23: The method of any of Aspects 18-22, wherein the one or more parameters comprise a wireless radio parameter; and wherein determining the XR compute location comprises: determining the XR compute location based at least in part on whether the wireless radio parameter satisfies a threshold, wherein determining the XR compute location comprises: determining the XR compute location based at least in part on whether the wireless radio parameter satisfies a threshold.

Aspect 24: The method of Aspect 23, wherein the threshold comprises a combination of a threshold parameter and a sensitivity parameter.

Aspect 25: The method of Aspect 23, wherein determining the XR compute location comprises: determining that the wireless radio parameter satisfies the threshold; and determining the XR compute location to be the network node based at least in part on determining that the wireless radio parameter satisfies the threshold. determining that the wireless radio parameter satisfies the threshold; and determining the XR compute location to be the network node based at least in part on determining that the wireless radio parameter satisfies the threshold.

Aspect 26: The method of Aspect 23, wherein the threshold comprises a first threshold; and wherein determining the XR compute location comprises: determining that the wireless radio parameter does not satisfy a second threshold; and determining, based at least in part on determining that the wireless radio parameter does not satisfy the second threshold, the XR compute location to be the XR device, wherein determining the XR compute location comprises: determining that the wireless radio parameter does not satisfy a second threshold; and determining, based at least in part on determining that the wireless radio parameter does not satisfy the second threshold, the XR compute location to be the XR device.

Aspect 27: The method of Aspect 23, wherein the threshold comprises a first threshold; and wherein determining the XR compute location comprises: determining that the wireless radio parameter does not satisfy a second threshold; and determining, based at least in part on determining that the wireless radio parameter does not satisfy the second threshold, the XR compute location to be the UE associated with the XR device, wherein determining the XR compute location comprises: determining that the wireless radio parameter does not satisfy a second threshold; and determining, based at least in part on determining that the wireless radio parameter does not satisfy the second threshold, the XR compute location to be the UE associated with the XR device.

Aspect 28: The method of Aspect 27, wherein the first threshold comprises a combination of a threshold parameter and a first sensitivity parameter; wherein the second threshold comprises a combination of the threshold parameter and a second sensitivity parameter; and wherein the first sensitivity parameter is greater relative to the second sensitivity parameter, wherein the second threshold comprises a combination of the threshold parameter and a second sensitivity parameter; and wherein the first sensitivity parameter is greater relative to the second sensitivity parameter.

Aspect 29: The method of Aspect 23, wherein the threshold comprises a first threshold; and wherein determining the XR compute location comprises: determining that the wireless radio parameter does not satisfy the first threshold; determining that the wireless radio parameter satisfies a second threshold; and determining to maintain the XR compute location for the XR data based at least in part one determining that the wireless radio parameter does not satisfy the first threshold and that the wireless radio parameter satisfies the second threshold, wherein determining the XR compute location comprises: determining that the wireless radio parameter does not satisfy the first threshold; determining that the wireless radio parameter satisfies a second threshold; and determining to maintain the XR compute location for the XR data based at least in part one determining that the wireless radio parameter does not satisfy the first threshold and that the wireless radio parameter satisfies the second threshold.

Aspect 30: The method of any of Aspects 18-29, wherein the one or more parameters comprise one or more wireless radio condition predictions; and wherein the one or more wireless radio condition predictions comprise at least one of: a wireless radio blockage prediction associated with the XR device, or a radio frequency (RF) environment mapping of an area in which the XR device is located, wherein the one or more wireless radio condition predictions comprise at least one of: a wireless radio blockage prediction associated with the XR device, or a radio frequency (RF) environment mapping of an area in which the XR device is located.

Aspect 31: The method of any of Aspects 18-30, wherein the one or more parameters comprise one or more wireless radio condition predictions; and wherein the one or more wireless radio condition predictions comprise at least one of: a wireless radio blockage prediction associated with the UE associated with the XR device, or a radio frequency (RF) environment mapping of an area in which the UE is located, wherein the one or more wireless radio condition predictions comprise at least one of: a wireless radio blockage prediction associated with the UE associated with the XR device, or a radio frequency (RF) environment mapping of an area in which the UE is located.

Aspect 32: The method of any of Aspects 18-31, wherein the one or more parameters comprise a plurality of power consumption parameters; and wherein the plurality of power consumption parameters comprise: a first estimated power consumption of the XR device if the XR compute location were the XR device, and a second estimated power consumption of the XR device if the XR compute location were the application server associated with the XR data, wherein the plurality of power consumption parameters comprise: a first estimated power consumption of the XR device if the XR compute location were the XR device, and a second estimated power consumption of the XR device if the XR compute location were the application server associated with the XR data.

Aspect 33: The method of Aspect 32, wherein the first estimated power consumption and the second estimated power consumption each include a combination of an estimated wireless radio power consumption of the XR device and an estimated XR compute power consumption of the XR device.

Aspect 34: The method of Aspect 32, wherein determining the XR compute location comprises: determining that the second estimated power consumption is greater relative to the first estimated power consumption; and determining the XR compute location to be the XR device based at least in part on determining that the second estimated power consumption is greater relative to the first estimated power consumption. determining that the second estimated power consumption is greater relative to the first estimated power consumption; and determining the XR compute location to be the XR device based at least in part on determining that the second estimated power consumption is greater relative to the first estimated power consumption.

Aspect 35: The method of Aspect 32, wherein determining the XR compute location comprises: determining that the first estimated power consumption is greater relative to the second estimated power consumption; and determining the XR compute location to be the application server based at least in part on determining that the first estimated power consumption is greater relative to the second estimated power consumption. determining that the first estimated power consumption is greater relative to the second estimated power consumption; and determining the XR compute location to be the application server based at least in part on determining that the first estimated power consumption is greater relative to the second estimated power consumption.

Aspect 36: The method of any of Aspects 18-35, wherein the one or more parameters comprise a plurality of power consumption parameters; and wherein the plurality of power consumption parameters comprise: a first estimated power consumption of the UE, associated with the XR device, if the XR compute location were the UE, and a second estimated power consumption of the UE if the XR compute location were the application server associated with the XR data, wherein the plurality of power consumption parameters comprise: a first estimated power consumption of the UE, associated with the XR device, if the XR compute location were the UE, and a second estimated power consumption of the UE if the XR compute location were the application server associated with the XR data.

Aspect 37: The method of Aspect 36, wherein the first estimated power consumption and the second estimated power consumption each include a combination of an estimated wireless radio power consumption of the UE and an estimated XR compute power consumption of the UE.

Aspect 38: The method of Aspect 36, wherein determining the XR compute location comprises: determining that the second estimated power consumption is greater relative to the first estimated power consumption; and determining the XR compute location to be the UE based at least in part on determining that the second estimated power consumption is greater relative to the first estimated power consumption. determining that the second estimated power consumption is greater relative to the first estimated power consumption; and determining the XR compute location to be the UE based at least in part on determining that the second estimated power consumption is greater relative to the first estimated power consumption.

Aspect 39: The method of Aspect 36, wherein determining the XR compute location comprises: determining that the first estimated power consumption is greater relative to the second estimated power consumption; and determining the XR compute location to be the application server based at least in part on determining that the first estimated power consumption is greater relative to the second estimated power consumption. determining that the first estimated power consumption is greater relative to the second estimated power consumption; and determining the XR compute location to be the application server based at least in part on determining that the first estimated power consumption is greater relative to the second estimated power consumption.

Aspect 40: The method of any of Aspects 18-39, wherein selectively transmitting the indication of the XR compute location to the network node comprises: transmitting the indication of the XR compute location to the UE for transmission to the network node. transmitting the indication of the XR compute location to the UE for transmission to the network node.

Aspect 41: The method of any of Aspects 18-40, wherein selectively transmitting the indication of the XR compute location to the network node comprises: transmitting the indication of the XR compute location directly to the network node on a wireless radio link between the XR device and the network node. transmitting the indication of the XR compute location directly to the network node on a wireless radio link between the XR device and the network node.

Aspect 42: The method of any of Aspects 18-41, wherein selectively transmitting the indication of the XR compute location to the network node comprises: refraining from transmitting the indication of the XR compute location based at least in part on determining to maintain the XR compute location. refraining from transmitting the indication of the XR compute location based at least in part on determining to maintain the XR compute location.

Aspect 43: A method of wireless communication performed by an application server, comprising: determining, based at least in part on one or more parameters, an extended reality (XR) compute location for XR data associated with an XR device, wherein the XR compute location corresponds to the XR device, a user equipment (UE) associated with the XR device, or an application server associated with the XR data; and selectively switching the XR compute location based at least in part on determining the XR compute location.

Aspect 44: The method of Aspect 43, wherein the one or more parameters comprise one or more downlink parameters associated with a downlink between a network node at the XR device.

Aspect 45: The method of Aspect 44, wherein the one or more downlink parameters comprise at least one of: a downlink reference signal received power (RSRP), or a downlink throughput. a downlink reference signal received power (RSRP), or a downlink throughput.

Aspect 46: An apparatus for wireless communication at a device, comprising a processor; memory coupled with the processor; and instructions stored in the memory and executable by the processor to cause the apparatus to perform the method of one or more of Aspects 1-45.

Aspect 47: A device for wireless communication, comprising a memory and one or more processors coupled to the memory, the one or more processors configured to perform the method of one or more of Aspects 1-45.

Aspect 48: An apparatus for wireless communication, comprising at least one means for performing the method of one or more of Aspects 1-45.

Aspect 49: A non-transitory computer-readable medium storing code for wireless communication, the code comprising instructions executable by a processor to perform the method of one or more of Aspects 1-45.

Aspect 50: A non-transitory computer-readable medium storing a set of instructions for wireless communication, the set of instructions comprising one or more instructions that, when executed by one or more processors of a device, cause the device to perform the method of one or more of Aspects 1-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   determine, based at least in part on one or more parameters, an extended reality (XR) compute location for XR data associated with an XR device that is associated with the UE, wherein the one or more parameters comprise one or more wireless radio parameters and wherein the one or more wireless radio parameters comprise at least one of: a reference signal received power (RSRP), or an enhanced link capacity estimate (eLCE),
   wherein the XR compute location corresponds to the UE, the XR device, or an application server associated with the XR data; and
   selectively transmit an indication of the XR compute location to a network node.

2. The UE of claim 1, wherein the one or more parameters comprise at least one of:
   one or more wireless radio parameters,
   one or more power consumption parameters, or
   one or more wireless radio condition predictions.

3. The UE of claim 2, wherein the one or more parameters further comprise at least one of:
   a packet loss rate associated with the UE,
   a round trip time (RTT) associated with the UE,
   an estimated network load associated with the network node, or
   an estimated load associated with the application server that is associated with the XR data.

4. The UE of claim 1, wherein the one or more parameters comprise a wireless radio parameter; and
   wherein the one or more processors, to determine the XR compute location, are configured to:

determine the XR compute location based at least in part on whether the wireless radio parameter satisfies a threshold.

5. The UE of claim 4, wherein the threshold comprises a first threshold; and
wherein the one or more processors, to determine the XR compute location, are configured to:
determine that the wireless radio parameter does not satisfy a second threshold; and
determine, based at least in part on determining that the wireless radio parameter does not satisfy the second threshold, the XR compute location to be the UE.

6. The UE of claim 5, wherein the first threshold comprises a combination of a threshold parameter and a first sensitivity parameter;
wherein the second threshold comprises a combination of the threshold parameter and a second sensitivity parameter; and
wherein the first sensitivity parameter is greater relative to the second sensitivity parameter.

7. The UE of claim 1, wherein the one or more parameters comprise one or more wireless radio condition predictions; and
wherein the one or more wireless radio condition predictions comprise at least one of:
a wireless radio blockage prediction associated with the UE, or
a radio frequency (RF) environment mapping of an area in which the UE is located.

8. The UE of claim 1, wherein the one or more parameters comprise a plurality of power consumption parameters; and
wherein the plurality of power consumption parameters comprise:
a first estimated power consumption of the UE if the XR compute location were the UE, and
a second estimated power consumption of the UE if the XR compute location were the application server associated with the XR data.

9. The UE of claim 8, wherein the first estimated power consumption and the second estimated power consumption each include a combination of an estimated wireless radio power consumption of the UE and an estimated XR compute power consumption of the UE.

10. An extended reality (XR) device for wireless communication, comprising:
a memory; and
one or more processors, coupled to the memory, configured to:
determine, based at least in part on one or more parameters, an XR compute location for XR data associated with the XR device,
wherein the XR compute location corresponds to the XR device, a user equipment (UE) associated with the XR device, or an application server associated with the XR data and wherein the one or more parameters comprise one or more wireless radio parameters; and wherein the one or more wireless radio parameters comprise at least one of: a reference signal received power (RSRP), or an enhanced link capacity estimate (eLCE); and
selectively transmit an indication of the XR compute location to a network node.

11. The XR device of claim 10, wherein the one or more parameters comprise at least one of:
one or more wireless radio parameters,
one or more power consumption parameters, or
one or more wireless radio condition predictions.

12. The XR device of claim 11, wherein the one or more parameters further comprise at least one of:
a packet loss rate,
a round trip time (RTT),
an estimated network load associated with the network node, or
an estimated load associated with the application server that is associated with the XR data.

13. The XR device of claim 10, wherein the one or more parameters comprise a wireless radio parameter; and
wherein the one or more processors, to determine the XR compute location, are configured to:
determine the XR compute location based at least in part on whether the wireless radio parameter satisfies a threshold.

14. The XR device of claim 13, wherein the threshold comprises a combination of a threshold parameter and a sensitivity parameter.

15. The XR device of claim 13, wherein the one or more processors, to determine the XR compute location, are configured to:
determine that the wireless radio parameter satisfies the threshold; and
determine the XR compute location to be the network node based at least in part on determining that the wireless radio parameter satisfies the threshold.

16. The XR device of claim 13, wherein the threshold comprises a first threshold; and
wherein the one or more processors, to determine the XR compute location, are configured to:
determine that the wireless radio parameter does not satisfy a second threshold; and
determine, based at least in part on determining that the wireless radio parameter does not satisfy the second threshold, the XR compute location to be the XR device.

17. The XR device of claim 13, wherein the threshold comprises a first threshold; and
wherein the one or more processors, to determine the XR compute location, are configured to:
determine that the wireless radio parameter does not satisfy a second threshold; and
determine, based at least in part on determining that the wireless radio parameter does not satisfy the second threshold, the XR compute location to be the UE associated with the XR device.

18. The XR device of claim 17, wherein the first threshold comprises a combination of a threshold parameter and a first sensitivity parameter;
wherein the second threshold comprises a combination of the threshold parameter and a second sensitivity parameter; and
wherein the first sensitivity parameter is greater relative to the second sensitivity parameter.

19. The XR device of claim 13, wherein the threshold comprises a first threshold; and
wherein the one or more processors, to determine the XR compute location, are configured to:
determine that the wireless radio parameter does not satisfy the first threshold;
determine that the wireless radio parameter satisfies a second threshold; and
determine to maintain the XR compute location for the XR data based at least in part one determining that the wireless radio parameter does not satisfy the first threshold and that the wireless radio parameter satisfies the second threshold.

20. The XR device of claim 10, wherein the one or more parameters comprise one or more wireless radio condition predictions; and
wherein the one or more wireless radio condition predictions comprise at least one of:
a wireless radio blockage prediction associated with the XR device, or
a radio frequency (RF) environment mapping of an area in which the XR device is located.

21. The XR device of claim 10, wherein the one or more parameters comprise one or more wireless radio condition predictions; and
wherein the one or more wireless radio condition predictions comprise at least one of:
a wireless radio blockage prediction associated with the UE associated with the XR device, or
a radio frequency (RF) environment mapping of an area in which the UE is located.

22. The XR device of claim 10, wherein the one or more parameters comprise a plurality of power consumption parameters; and
wherein the plurality of power consumption parameters comprise:
a first estimated power consumption of the XR device if the XR compute location were the XR device, and
a second estimated power consumption of the XR device if the XR compute location were the application server associated with the XR data.

23. The XR device of claim 22, wherein the first estimated power consumption and the second estimated power consumption each include a combination of an estimated wireless radio power consumption of the XR device and an estimated XR compute power consumption of the XR device.

24. The XR device of claim 10, wherein the one or more parameters comprise a plurality of power consumption parameters; and
wherein the plurality of power consumption parameters comprise:
a first estimated power consumption of the UE, associated with the XR device, if the XR compute location were the UE, and
a second estimated power consumption of the UE if the XR compute location were the application server associated with the XR data.

25. The XR device of claim 24, wherein the first estimated power consumption and the second estimated power consumption each include a combination of an estimated wireless radio power consumption of the UE and an estimated XR compute power consumption of the UE.

26. An application server for wireless communication, comprising:
a memory; and
one or more processors, coupled to the memory, configured to:
determine, based at least in part on one or more parameters, an extended reality (XR) compute location for XR data associated with an XR device,
wherein the XR compute location corresponds to the XR device, a user equipment (UE) associated with the XR device, or an application server associated with the XR data, and wherein the one or more parameters comprise one or more wireless radio parameters and wherein the one or more wireless radio parameters comprise at least one of: a reference signal received power (RSRP), or an enhanced link capacity estimate (eLCE); and
selectively switch the XR compute location based at least in part on determining the XR compute location.

27. The application server of claim 26, wherein the one or more parameters comprise one or more downlink parameters associated with a downlink between a network node and the XR device or the UE.

28. The application server of claim 27, wherein the one or more downlink parameters comprise at least one of:
a downlink reference signal received power (RSRP), or
a downlink throughput.

* * * * *